US012090611B2

(12) United States Patent
Duxbury

(10) Patent No.: US 12,090,611 B2
(45) Date of Patent: Sep. 17, 2024

(54) CLAMPING HANDLE ASSEMBLIES AND METHOD OF USE

(71) Applicant: Woodpeckers, LLC, Strongsville, OH (US)

(72) Inventor: Nathan William Duxbury, Northfield, OH (US)

(73) Assignee: Woodpeckers, LLC, Strongsville, OH (US)

( * ) Notice: Subject to any disclaimer, the term of this patent is extended or adjusted under 35 U.S.C. 154(b) by 131 days.

(21) Appl. No.: 17/391,752

(22) Filed: Aug. 2, 2021

(65) Prior Publication Data

US 2023/0032835 A1 Feb. 2, 2023

(51) Int. Cl.
*B25B 5/06* (2006.01)
*B25B 5/00* (2006.01)
*B25B 5/16* (2006.01)

(52) U.S. Cl.
CPC .............. *B25B 5/068* (2013.01); *B25B 5/006* (2013.01); *B25B 5/16* (2013.01)

(58) Field of Classification Search
CPC ........... B25B 5/068; B25B 5/006; B25B 5/16; B25B 5/082; B25B 5/101; B25B 3/00; B23Q 3/00
USPC ......................................... 269/6, 3, 143, 249
See application file for complete search history.

(56) References Cited

U.S. PATENT DOCUMENTS 422,361 A * 3/1890 Alton .................. F16B 37/0864 411/433
2,339,897 A * 1/1944 Wetzler ................... B25B 5/106 269/171.5
2,351,436 A * 6/1944 Ketz ....................... B25B 5/107 269/93
4,125,251 A * 11/1978 Jamieson, Jr. .......... B25B 5/006 269/45
D267,625 S 1/1983 Dark
4,884,914 A * 12/1989 Shultz ....................... B25B 5/10 403/324
D320,915 S 10/1991 Sanguino
5,090,283 A 2/1992 Noble
D332,562 S 1/1993 Fremont et al.
5,816,129 A 10/1998 Singer
D436,814 S 1/2001 Gore
D568,706 S 5/2008 Weiby
D568,707 S 5/2008 Weiby
D574,864 S 8/2008 McDaniel
D577,752 S 9/2008 McDaniel et al.
8,167,259 B2 * 5/2012 Spang, Jr. ........... A61M 39/283 248/230.4

(Continued)

*Primary Examiner* — David S Posigian
*Assistant Examiner* — Jacob Adam Montgomery
(74) *Attorney, Agent, or Firm* — Sand, Sebolt & Wernow Co., LPA

(57) ABSTRACT

A clamping handle assembly that is usable with woodworking tools that enables a user to suitably maintain and secure various types of workpiece and/or stock to a woodworking tool during a woodworking project. The clamping handle assembly comprises of a handle. The clamping handle assembly also comprises of a threaded shaft that is operably engaged with the handle, said threaded shaft is adapted to engage with a woodworking tool. The clamping handle assembly also comprises of a clamp block that is operably engaged with the threaded shaft, said clamp block is adapted to apply a clamping force to a workpiece. In addition, various types of clamp blocks may be included in a clamping handle assembly to suitably maintain and secure various types of workpiece and/or stock to a woodworking tool during a woodworking project.

11 Claims, 16 Drawing Sheets

(56) References Cited

U.S. PATENT DOCUMENTS

| | | | |
|---|---|---|---|
| D682,327 S | 5/2013 | Perez et al. | |
| D711,718 S | 8/2014 | Francaviglia | |
| D718,599 S | 12/2014 | Durocher et al. | |
| D809,032 S | 1/2018 | Cummings | |
| D809,578 S | 2/2018 | Cummings | |
| D892,582 S | 8/2020 | Doherty | |
| D894,707 S | 9/2020 | Hall | |
| D898,086 S | 10/2020 | Schaaf et al. | |
| D903,452 S | 12/2020 | Lin | |
| D903,456 S | 12/2020 | Hall | |
| D913,347 S | 3/2021 | Hall | |
| 2003/0015078 A1 | 1/2003 | Taylor | |
| 2006/0027289 A1 | 2/2006 | Lin | |
| 2017/0009798 A1* | 1/2017 | Archer | F16B 37/044 |

* cited by examiner

CLAMPING HANDLE ASSEMBLIES AND METHOD OF USE

TECHNICAL FIELD

The present disclosure generally relates to a multipurpose clamping member. More particularly, the present disclosure generally relates to a clamping handle assembly. Specifically, the present disclosure relates to at least one clamping handle assembly that is usable with woodworking tools which enables a user to suitably maintain and secure various types of workpiece and/or stock to a woodworking tool during a woodworking project.

BACKGROUND

Clamps are versatile tools that are used in multiple projects for maintaining and securing various types of workpiece and stock, such as wood workpiece. Generally, clamps and devices of the like are used in various woodworking projects for maintaining and securing a workpiece to various woodworking tools, such as angled guided systems, drill presses, clamping tables, and other suitable woodworking tools. While a woodworker may use these clamps and devices of the like to maintain and secure a workpiece with woodworking tools, it is rather difficult in some situations to suitably maintain and secure said workpiece to woodworking tools due to the size, shape, or configuration of said workpiece.

To address these difficulties and problems, a woodworker may need to select more than one type of clamping device to help stabilize and maintain a workpiece to the woodworking tool during a cutting or drilling process. While such clamping devices are provided in the market, the woodworker may have to use a number of different clamping devices or additional assisting devices to make precise and accurate cuts and/or holes into a workpiece. For example, a woodworker may have to use a first set of clamping devices with a woodworking tool for making cuts into a workpiece and a second set of clamping devices with the same woodworking tool for drilling holes into a workpiece. In another example, a woodworker may have to use a first set of devices for securing and maintaining a workpiece to a woodworking tool and a second set of devices for guiding and/or assisting the woodworker in order to make a cut into the workpiece. Such use of multiple clamping devices and assisting devices requires the woodworker to have access to these various clamping devices and assisting devices and requires the expenditure of more time and effort when the woodworker is making multiple cuts or drilling multiple holes into a workpiece.

SUMMARY

The presently disclosed clamping handle assembly provides a woodworker with multifunctional use for maintaining and securing a workpiece to a woodworking tool in order to make precise and accurate cuts and/or holes while the workpiece is stationary. The disclosed clamping handle assembly may reduce the overall number of clamping handle assembly and/or assisting devices that a woodworker has to use to complete a project and may also the reduce the project's completion time since the need to switch between multiple devices is avoided. The disclosed clamping handle assembly may also provide a woodworker with quick adjustment and alignment of said clamping handle assembly due to the modularity of the clamping handle assembly when provided with a woodworking tool. As such, the clamping handle assembly disclosed herein addresses some of the inadequacies of previously known clamp and/or clamping handle assembly assisting devices In one aspect, an exemplary embodiment of the present disclosure may provide a clamping handle assembly. The clamping handle assembly may include a handle. The clamping handle assembly may include a threaded shaft operably engaged with the handle, said threaded shaft being adapted to engage with a woodworking tool. The clamping handle assembly may include a clamp block operably engaged with the threaded shaft, said clamp block being adapted to apply a clamping force to a workpiece.

This exemplary embodiment or another exemplary embodiment may further provide a gripping mechanism operably engaged with the handle and the threaded shaft. This exemplary embodiment or another exemplary embodiment may further provide that the gripping mechanism is moveably disposed between an engaged position and a disengaged position relative to the threaded shaft. This exemplary embodiment or another exemplary embodiment may further provide that the threaded shaft is freely moveable inside the handle when the gripping mechanism is in the disengaged position. This exemplary embodiment or another exemplary embodiment may further provide that the threaded shaft has a first end and a second end, and wherein a portion of the threaded shaft which is located between the first end and the second end is maintained inside of the handle when the gripping mechanism is in the engaged position. This exemplary embodiment or another exemplary embodiment may further provide that the threaded shaft is releasably engaged with the gripping mechanism when the gripping mechanism is in the engaged position. This exemplary embodiment or another exemplary embodiment may further provide that the gripping mechanism comprises a push button; a pin operably engaged with the handle for limiting the push button between the engaged position and the disengaged position; and a biaser operably engaged with the push button biasing the push button to the engaged position. This exemplary embodiment or another exemplary embodiment may further provide that the threaded shaft further comprises a bolt head that is adapted to be operably engaged within an opening defined by the woodworking tool. This exemplary embodiment or another exemplary embodiment may further provide a threaded nut operably engaged with the threaded shaft and adapted to selectively abut a surface of the woodworking tool. This exemplary embodiment or another exemplary embodiment may further provide that the handle and the clamp block interlockingly engage with one another. This exemplary embodiment or another exemplary embodiment may further provide that the clamp block is selectively movable between a first orientation and a second orientation. This exemplary embodiment or another exemplary embodiment may further provide that the clamp block includes a first holding portion having a first length, and a second holding portion having a second length, where the second length is shorter than the first length; and when the clamp block is in the first orientation, the first holding portion is adapted to engage the workpiece; and when the clamp block is in the second orientation, the second holding portion is adapted to engage the workpiece. This exemplary embodiment or another exemplary embodiment may further provide that the clamp block has a generally T-shaped configuration and comprises a support member operably engaged with the threaded shaft and the handle; and a clamping portion having a first holding portion and a second holding portion, wherein the second holding portion is of a greater length than the first holding portion. This exemplary embodiment or another exemplary embodiment may further provide that the clamp block comprises a clamping portion having a first holding portion and a second holding portion, wherein the second holding portion is orthogonal to the first holding portion; and a support member extending outwardly from the second holding portion in a direction opposite to the first holding portion; and wherein the support member is operably engaged with the threaded shaft and the handle. This exemplary embodiment or another exemplary embodiment may further provide that the clamp block comprises a clamping portion having a first holding portion and a second holding portion, wherein the first holding portion has a curvilinear-shape; and a support member extending orthogonally outwardly from the second holding portion.

In another aspect, an exemplary embodiment of the present disclosure may provide a method of maintaining a workpiece relative to a woodworking tool. The method comprising the steps of operably engaging a handle of at least one clamping handle assembly to a threaded shaft; determining a desired location for the at least one clamping handle assembly on the woodworking tool; operably engaging the threaded shaft with the woodworking tool at the desired location; operably engaging a clamp block with the threaded shaft; applying a clamping force to the workpiece with the clamp block.

This exemplary embodiment or another exemplary embodiment may further provide the step of operably coupling the clamp block to the handle of the at least one clamping handle assembly. This exemplary embodiment or another exemplary embodiment may further provide that the step of operably coupling the clamp block to the handle is preceded by: selecting to orient the clamp block in one of a first orientation and a second orientation. This exemplary embodiment or another exemplary embodiment may further provide the steps of releasably threading a nut to the threaded shaft; abutting the nut to the woodworking tool; and maintaining the threaded shaft at the desired location on the woodworking tool. This exemplary embodiment or another exemplary embodiment may further provide the step of releasably attaching the handle to the threaded shaft. This exemplary embodiment or another exemplary embodiment may further provide the steps of operably coupling the clamp block to the handle; moving a gripping mechanism of the handle from an engaged position to a disengaged position; and moving the handle to a desired position along the threaded shaft. This exemplary embodiment or another exemplary embodiment may further provide the steps of releasing the gripping mechanism; moving the gripping mechanism from the disengaged position to the engaged position; and locking the handle to the threaded shaft at the desired position. This exemplary embodiment or another exemplary embodiment may further provide the steps of rotating the handle about the threaded shaft; and clamping the clamp block against the workpiece.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
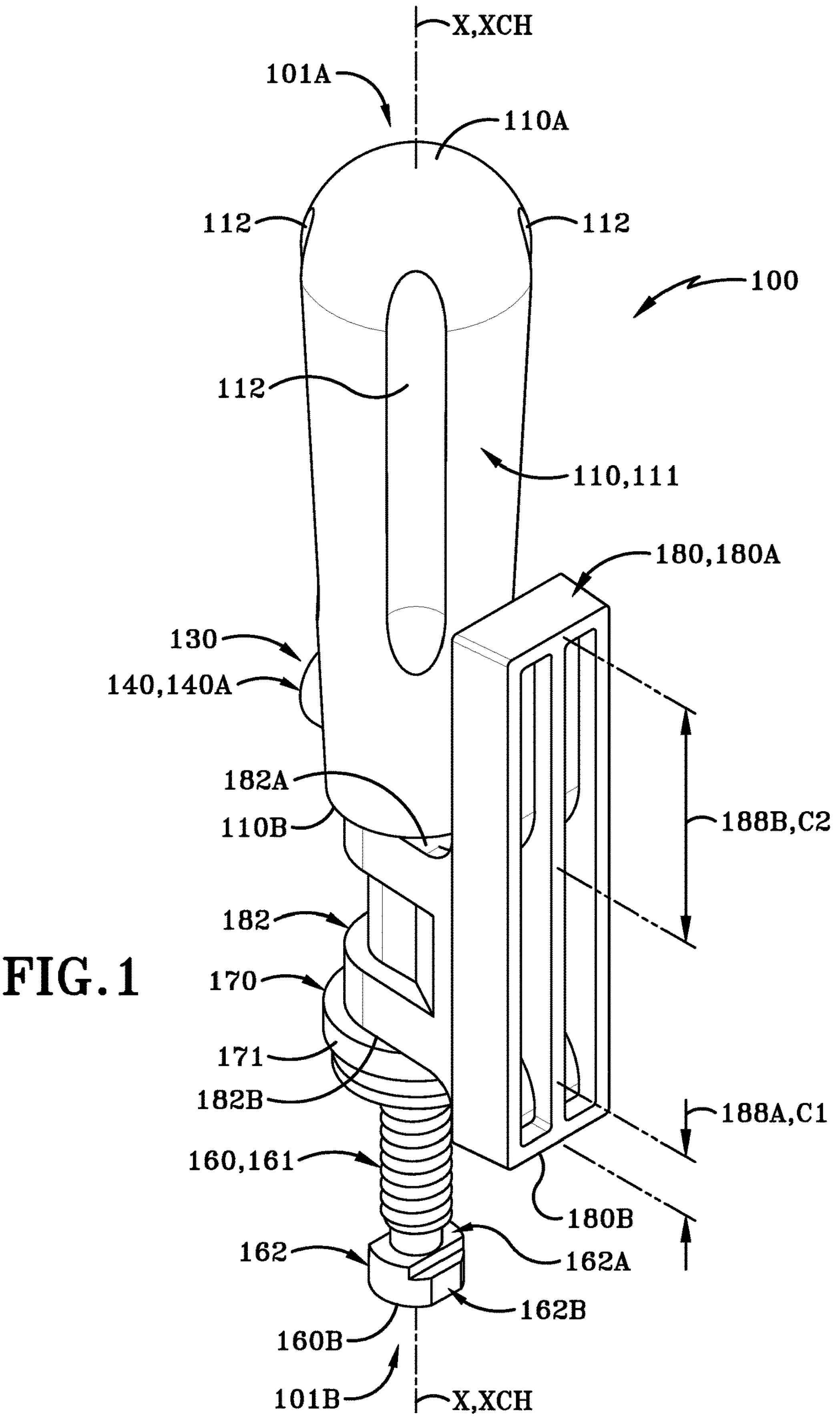
FIG. 1 is top, rear isometric perspective view of a clamping handle assembly in accordance with an aspect of the present disclosure.

As illustrated in FIG. 1, a clamping handle assembly 100 includes a first end or top end 101A, an opposed second end or bottom end 101B, and a longitudinal axis “X” that extends from the first end 101A to the bottom end 101B. It should be understood that the terms “front”, “rear”, “top”, bottom”, “right”, and “left” are used to describe the orientation of the clamping handle assembly 100 illustrated in the attached figures and should in no way be considered to limit the orientation that the clamping handle assembly 100 may be utilized.

The clamping handle assembly 100 or a plurality of clamping handle assemblies described and illustrated herein may operably engage to any suitable tool and/or woodworking tool as desired by a woodworker. The arrangement and configuration of the clamping handle assembly 100 described and illustrated herein is substantially identical to additional clamping handle assemblies that are selectively operably engageable with any suitable tool and/or woodworking tool as desired by a woodworker. Inasmuch as the at least one clamping handle assembly 100 may include additional clamping handle assemblies, the following description will relate to a single clamping handle assembly 100. It should be understood, however, that the description of the clamping handle assembly 100 applies substantially equally to any and all additional clamping handle assemblies 100 that are selectively operably engageable with any suitable tool and/or woodworking tool as desired by a woodworker.

Figure 2:
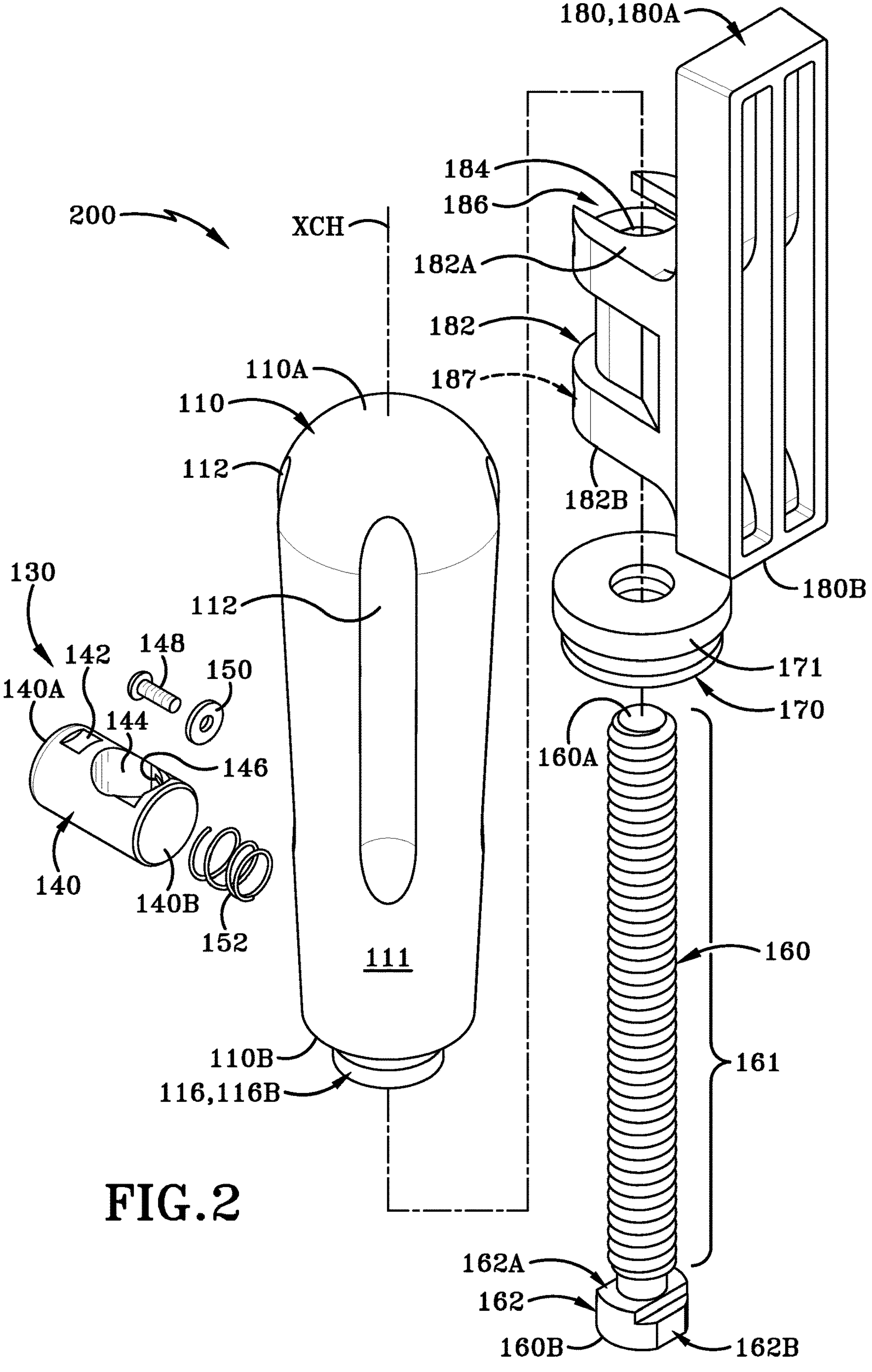
FIG. 2 is an exploded view of the clamping handle assembly in FIG. 1.

Referring to FIGS. 1 and 2, the clamping handle assembly 100 may have a handle 110, and gripping mechanism 130 provided with the handle 110, a threaded shaft 160 separable from the handle 110 and the gripping mechanism 130, a threaded nut 170 separable from the threaded shaft 160, and a clamp block 180 separable from the handle 110 and the threaded shaft 160. Such description of the associated parts of each clamping handle assembly 100 is described in more detail below.

Referring to FIGS. 1 and 2, the handle 110 includes a top end 110A, an opposed bottom end 1106, and a longitudinal axis "$X_{CH}$" that extends between the top end 110A and the bottom end 1106 and parallel with the longitudinal axis "X". The handle 110 also includes an exterior surface 111 that extends from the top end 110A to the bottom end 1106. The handle 110 also defines a plurality of indentations 112 between the top end 110A and the bottom end 1106. Each indentation of the plurality of indentations 112 also extends from the exterior surface 111 and into the handle 110. The plurality of indentations 112 provides a woodworker with additional gripping surfaces when using or actuating the clamping handle assembly 100 during a woodworking project, which will be described in more detail below.

Figure 3:
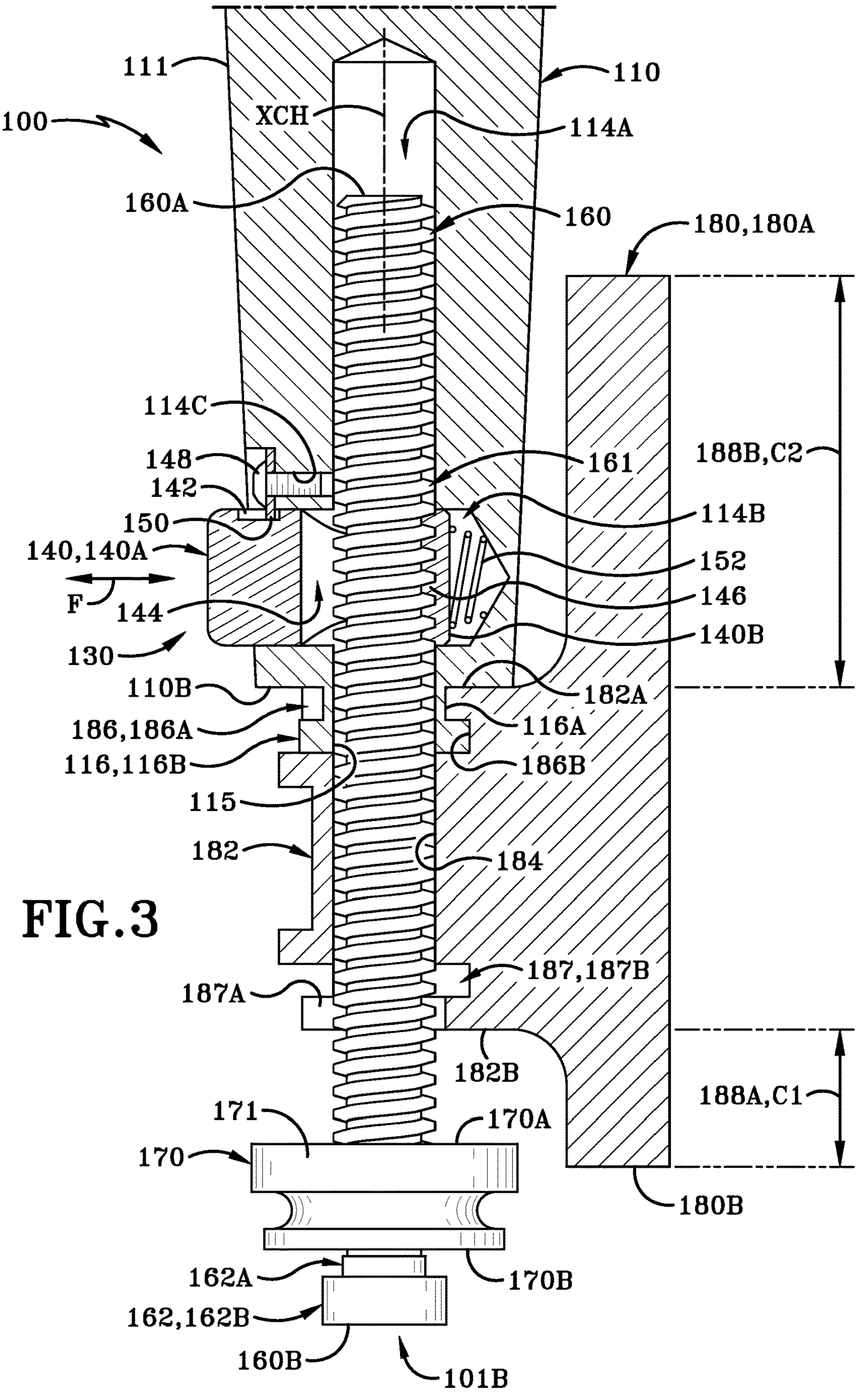
FIG. 3 is a longitudinal cross-section of the clamping handle assembly shown in FIG. 1, wherein the clamping handle assembly is operably engaged to a woodworking tool, and wherein a gripping mechanism is moveable between an engaged position and a disengaged position.

Referring to FIG. 3, the handle 110 also defines a first chamber 114A that extends from an opening 115 positioned at the bottom end 1106 of the handle 110 towards the top end 110A of the handle 110. The first chamber 114A of the handle 110 is also parallel to the longitudinal axis "$X_{CH}$". The handle 110 also defines a second chamber 114B that is orthogonal to the first chamber 114A and the longitudinal axis "$X_{CH}$". The second chamber 114B is also in fluid communication with the first chamber 114A due to the second chamber 114B intersecting the first chamber 114A proximate to the bottom end 1106 of the handle 110. The second chamber 114B is substantially shorter than the first chamber 114A. The handle 110 also defines a threaded chamber 114C that is orthogonal to the first chamber 114A and the longitudinal axis "$X_{CH}$" and parallel with the second chamber 114B relative to a transverse axis of the handle 110. The threaded chamber 114C is defined between the top end 110A and the bottom end 1106 and is positioned above the second chamber 114B relative to the longitudinal axis "$X_{CH}$" Such use of the threaded chamber 114C is described in more detail below.

Referring to FIGS. 2 and 3, the handle 110 also has an extension 116 that extends downwardly from bottom end 1106 and away from the handle 110. The extension 116 defines an annular groove 116A that extends circumferentially into the extension 116. In addition, the extension 116 defines a lip 116B that is disposed adjacent to the annular groove 116A. As illustrated in FIG. 2, the annular groove 116A defines a first outer diameter "$OD_1$" and the lip 1166 defines a second outer diameter "$OD_2$" where the second outer diameter "$OD_2$" is greater than the first outer diameter "$OD_1$". Such use of the annular groove 116A and the lip 116B is described in more detail below.

Still referring to FIGS. 2 and 3, the clamping handle assembly 100 also includes a gripping mechanism 130. The gripping mechanism 130 includes a push button 140 that has a first end 140A, an opposed second end 140B, and a longitudinal axis defined between the first end 140A and the second end 140B. The push button 140 defines an indent 142 proximate the first end 140A of the push button 140. The indent 142 also extends into the push button 140 orthogonally to the longitudinal axis of the push button 140. The push button 140 also defines a passageway 144 that extends between the first end 140A and the second end 140B. Such use of the passageway 144 is described in more detail below. The push button 140 also has a threaded wall 146 positioned inside of the passageway 144 proximate to the second end 140B of the push button 140 where the threaded wall 146 extends towards the first end 140A. The threaded wall 146 is also described in more detail below.

Still referring to FIGS. 2 and 3, the gripping mechanism 130 includes a pin 148 that is positioned inside of the indent 142 of the push button 140 and operably engages with the threaded chamber 114C of the handle 110. In addition, a washer 150 is provided with the pin 148 in which the washer 150 is positioned between the head of the pin 148 and the threaded chamber 114C when the gripping mechanism 130 is assembled to the handle 110. The engagement between the pin 148 and the washer 150 with the threaded chamber 114C limits the movement of the gripping mechanism 130, specifically the movement of the push button 140, during actuation between an engaged position and a disengaged position. In other words, the pin 148 retains the push button 148 inside of the handle 110 when the threaded shaft 160 is remote from the handle 110. Such movement of the gripping mechanism is provided in more detail below.

Still referring to FIGS. 2 and 3, the gripping mechanism 130 also includes a biaser 152. The biaser 152 is positioned inside of the second chamber 114B and directly abuts the second end 140B of the push button 140 and the handle 110 inside of the second chamber 114B. Such use of the biaser 152 is described in more detail below. In addition, the biaser 152 may be any suitable biaser that provides a biasing means to the push button 140. In one example, the biaser may be a compression spring.

As illustrated in FIG. 3, the gripping mechanism 130 is moveable disposed inside of the second chamber 114B of the handle 110 between an engaged position and a disengaged position. Such engagement and disengagement on the gripping mechanism 130 is denoted by a double arrow labeled "F". In the engaged position, a portion of the push button 140 measured from the first end 140A towards the second end 140B is positioned outside of the handle 110 and the threaded wall 146 is positioned inside of the first chamber 114A (see FIGS. 3 and 5B). In addition, the head of the pin 148 and the washer 150 are positioned proximate to the passageway 144 in which the washer 150 in engaged with the push button 140 inside of the indent 142. In the disengaged position, a smaller portion of the push button 140 measured from the first end 140A towards the second end 140B is positioned outside of the handle 110 and the threaded wall 146 is positioned away from the first chamber 114A (see FIG. 5A). In addition, the pin 148 and the washer 150 are positioned proximate to the first end 140A in which the washer 150 in disengaged from the push button 140 inside of the indent 142. In the illustrated embodiment, the push button 140 is biased towards the engaged position via the biaser 152 creating a biasing mechanism. The gripping mechanism 130 may be actuated to the disengaged position via a pushing force being exerted on the gripping mechanism 130 by a woodworker using the clamping handle assembly 100 during a woodworking project. Such engaged position and disengaged position of the gripping mechanism 130 is described in more detail below.

Referring to FIGS. 2 and 3, the clamping handle assembly 100 also includes a threaded shaft 160 that has a top end 160A, an opposed bottom end 160B, and a longitudinal direction that extends between the top end 160A and the bottom end 160B. The threaded shaft 160 includes a threaded portion 161 and a bolt head 162. The threaded portion 161 extends from the top end 160A to the bolt head 162. As described in more detail herein, the threaded portion 161 operably engages with the threaded chamber 146 when the push button 130 is provided in an engaged position.

During use, a portion of the threaded shaft 160 measured between the top end 160A and the bottom end 160B operably engages with the gripping mechanism 130 inside of the handle 110 when the gripping mechanism 130 is provided in the engaged position. As such, the threaded shaft 160 may be maintained and/or fixed at any suitable location between the top end 160A and the bottom end 160B of the threaded shaft 160 via the gripping mechanism 130. In addition, the threaded shaft 160 may also be releasably attached to the gripping mechanism 130 in the engaged position where a woodworker may apply a rotational force on the handle 110 to move the handle 110 upwardly or downwardly on the threaded shaft 160 relative to the longitudinal axis "$X_{CH}$". Moreover, the threaded shaft 160 may be freely moveable inside of the first chamber 114A of the handle 110 when the gripping mechanism 130 is actuated to the disengaged position via a pushing force exerted by the woodworker against the push button 140.

The threaded shaft 160 also includes the bolt head 162 that is disposed between the threaded portion 161 and the bottom end 160B of the threaded shaft 160. As illustrated in FIGS. 1 and 2, the bolt head 162 has a first portion 162A that extends from the threaded portion 161 towards the bottom end 160B of the threaded shaft 160. Still referring to FIGS. 1 and 2, the bolt head 162 also has a second portion 162B that extends from first portion 162A to the bottom end 160B of the threaded shaft 160. Such use of the bolt head 162 is described in more detail below.

Figure 5A:
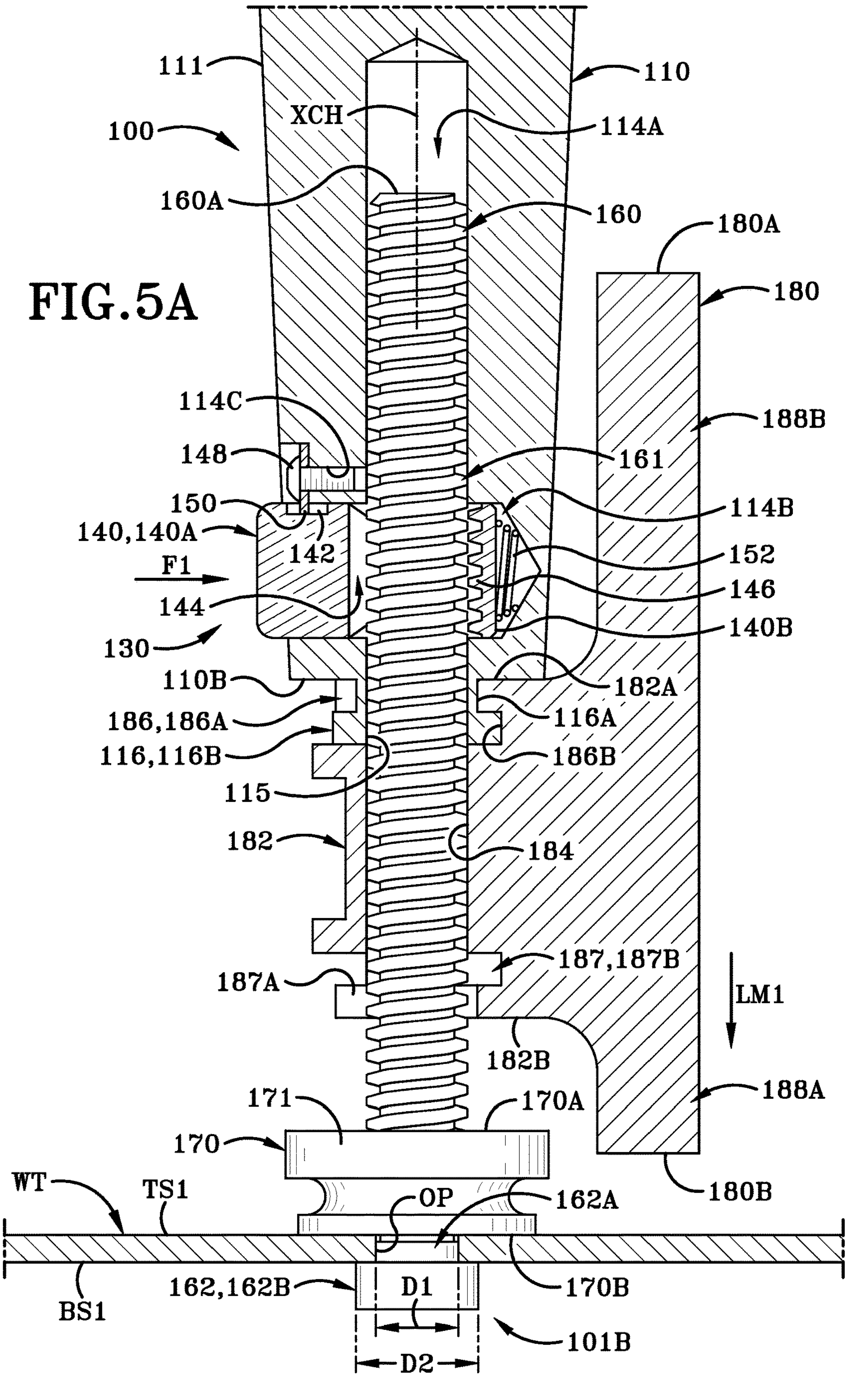
FIG. 5A is a longitudinal cross-section of the clamping handle assembly shown in FIG. 3, wherein the gripping mechanism is actuated from the engaged position to the disengaged position, and wherein the handle and the clamp block are linearly moveable along the threaded shaft.

Still referring to FIGS. 2 and 3, the clamping handle assembly 100 also includes a threaded nut 170. The threaded nut 170 operably engages with the threaded shaft 160 such that the threaded nut 170 is releasably attachable to the threaded shaft 160. As illustrated in FIG. 5A, the threaded nut 170 may directly abut a top surface "TS" of a woodworking tool "WT" to allow the clamping handle assembly 100 to be maintained at a desired location on the woodworking tool "WT". In addition, the threaded nut 170 may have an outer knurled surface 171 that allows a woodworker to suitably grip the threaded nut 170 when tightening or loosening the threaded nut 170 to the threaded shaft 160.

Figure 10:
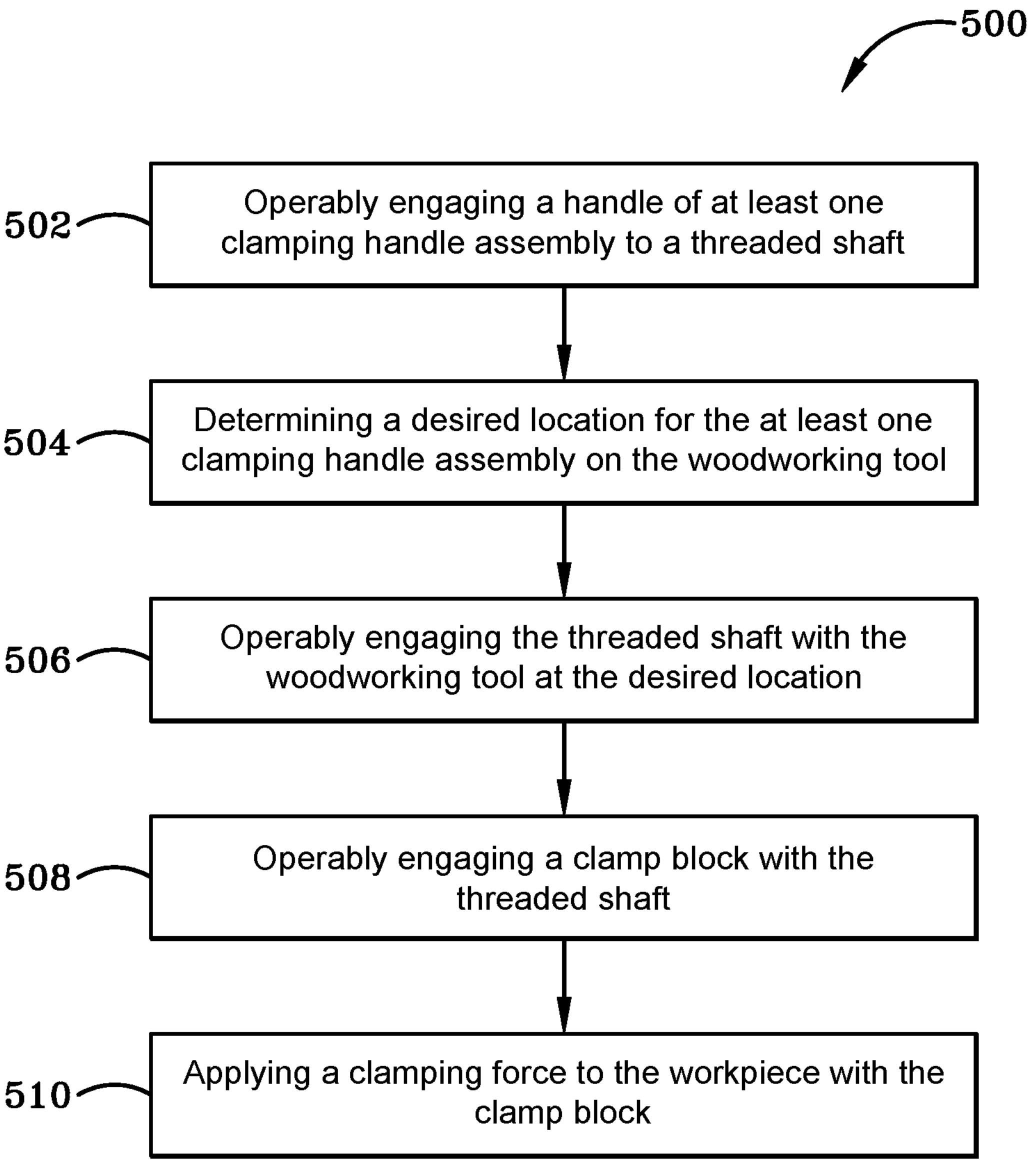
FIG. 10 is a method of using at least one clamping handle assembly with a woodworking tool.

Still referring to FIGS. 2 and 3, the clamping handle assembly 100 also includes a clamp block 180. The clamp block 180 includes a top end 180A, an opposed bottom 180B, and a longitudinal direction that extends between the top end 180A and the bottom end 180B. As illustrated in FIG. 10, the clamp block 180 includes a support member 182 that has a first end or top end 182A proximate to the top end 180A of the clamp block 180 and an opposed second end or bottom end 182B proximate to the bottom end 180B of the clamp block 180. The clamp block 180 also defines a central passageway 184 in the support member 182 that extends from the top end 182A to the bottom end 182B in the longitudinal direction of the clamp block 180. The central passageway 184 is sized and configured to receive and house a portion of the threaded shaft 160 when the clamp block 180 is provided on the threaded shaft 160 during a cutting operation, which is described in more detail below.

In addition, the support member 182 defines a first slot 186 at the top end 182A of the support member 182 and a second slot 187 at the bottom end 1806 of the clamp block 180. The first slot 186 and second slot 187 also define a generally T-shape configuration and extend laterally into the support member 182 orthogonal to the longitudinal direction of the clamp block 180. In the illustrated embodiment, the first slot 186 defines a first section 186A proximate the top end 182A of the support member 182 and a second section 186B adjacent to the first section 186A in which the first section 186A and the second section 186B are arranged side-by-side on the support member 182 and are in fluid communication with each other. In addition, the first section 186A defines a first diameter and the second section 186B defines a second diameter that is greater than the first diameter. Similarly, the second slot 187 defines a first section 187A proximate the bottom end 182B of the support member 182 and a second section 187B adjacent to the first section 187A in which the first section 187A and the second section 187B are arranged side-by-side on the support member 182 and are in fluid communication with each other. In addition, the first section 187A defines a first diameter and the second section 187B defines a second diameter that is greater than the first diameter.

In the illustrated embodiment, the first slot 186 and the second slot 187 face one another on the support member 182 relative to the longitudinal direction of the clamp block 180. The first slot 186 and second slot 187 also define a T-shape configuration and extend laterally into the support member 182 substantially perpendicularly to the longitudinal direction of the clamp block 180. In the illustrated embodiment, each of the first slot 186 and the second slot 187 is sized and configured to receive the extension 116 in which the clamp block 180 operably engages with the handle 110. Such engagement between the clamp block 180 and the handle 110 allows the clamp block 180 to be reversible in a first orientation and a second orientation.

Figure 4A:
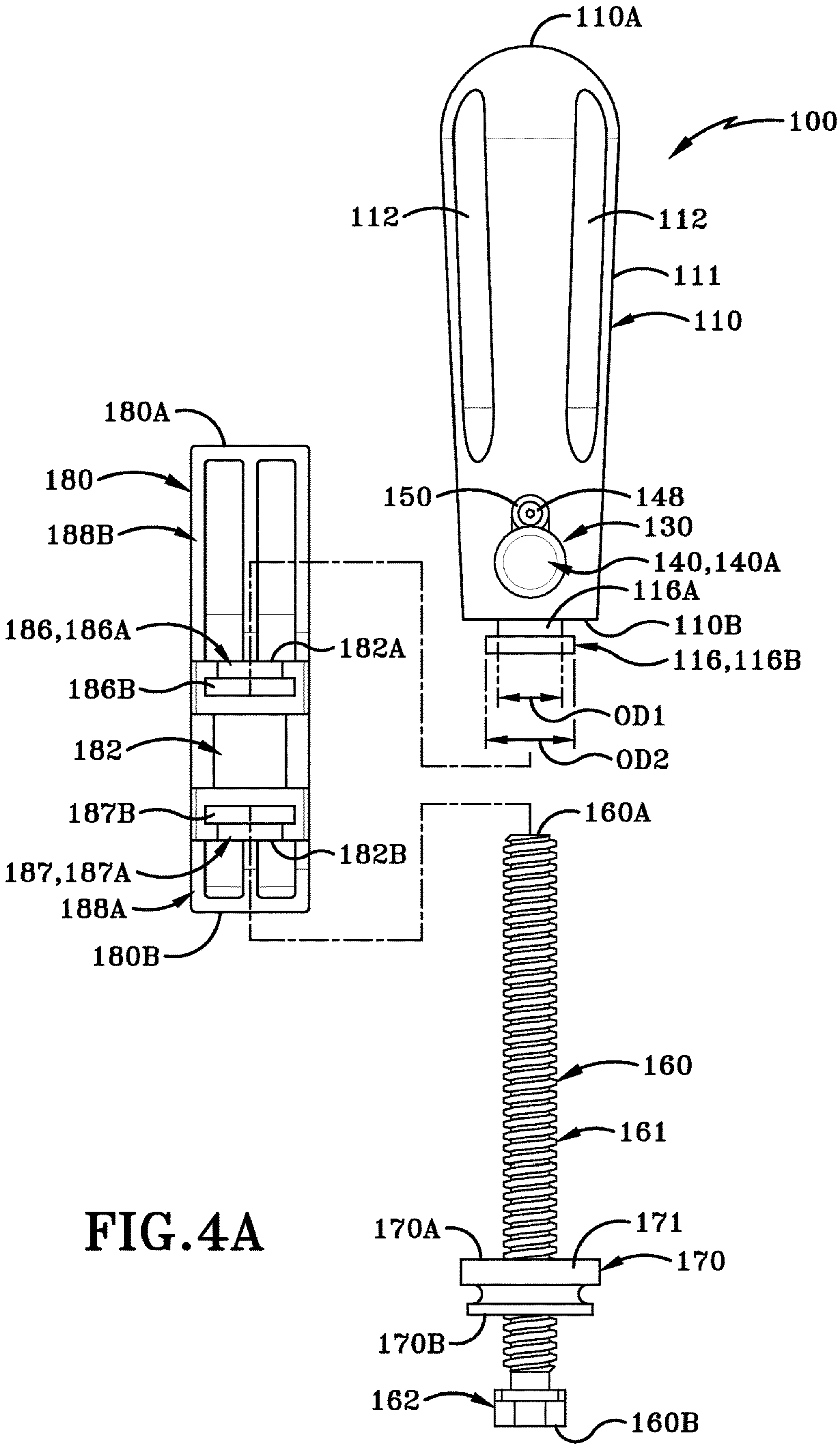
FIG. 4A is an exploded view of the clamping handle assembly in FIG. 1, wherein a clamping block is oriented in a first orientation.

As illustrated in FIG. 4A, the clamp block 180 is provided in the first orientation relative to the handle 110. In the illustrated embodiment, the first section 186A of the first slot 186 is sized and configured to receive and house the annular groove 116A of the extension 116. In addition, the second section 186B of the first slot 186 is sized and configured to receive and house the lip 116B of the extension 116. Such engagement between the first slot 186 and the extension 116 allows the clamp block 180 to operably engage with the handle 110. In other words, the clamp block 180 interlockingly engages with the handle 110. Moreover, the second slot 187 is positioned away from the handle 110 in the first orientation. Furthermore, the threaded shaft 160 may be feed through the central passageway 184 of the clamp block 180 to collectively operably engage the handle 110 and the clamp block 180 to the threaded shaft 160.

Figure 4B:
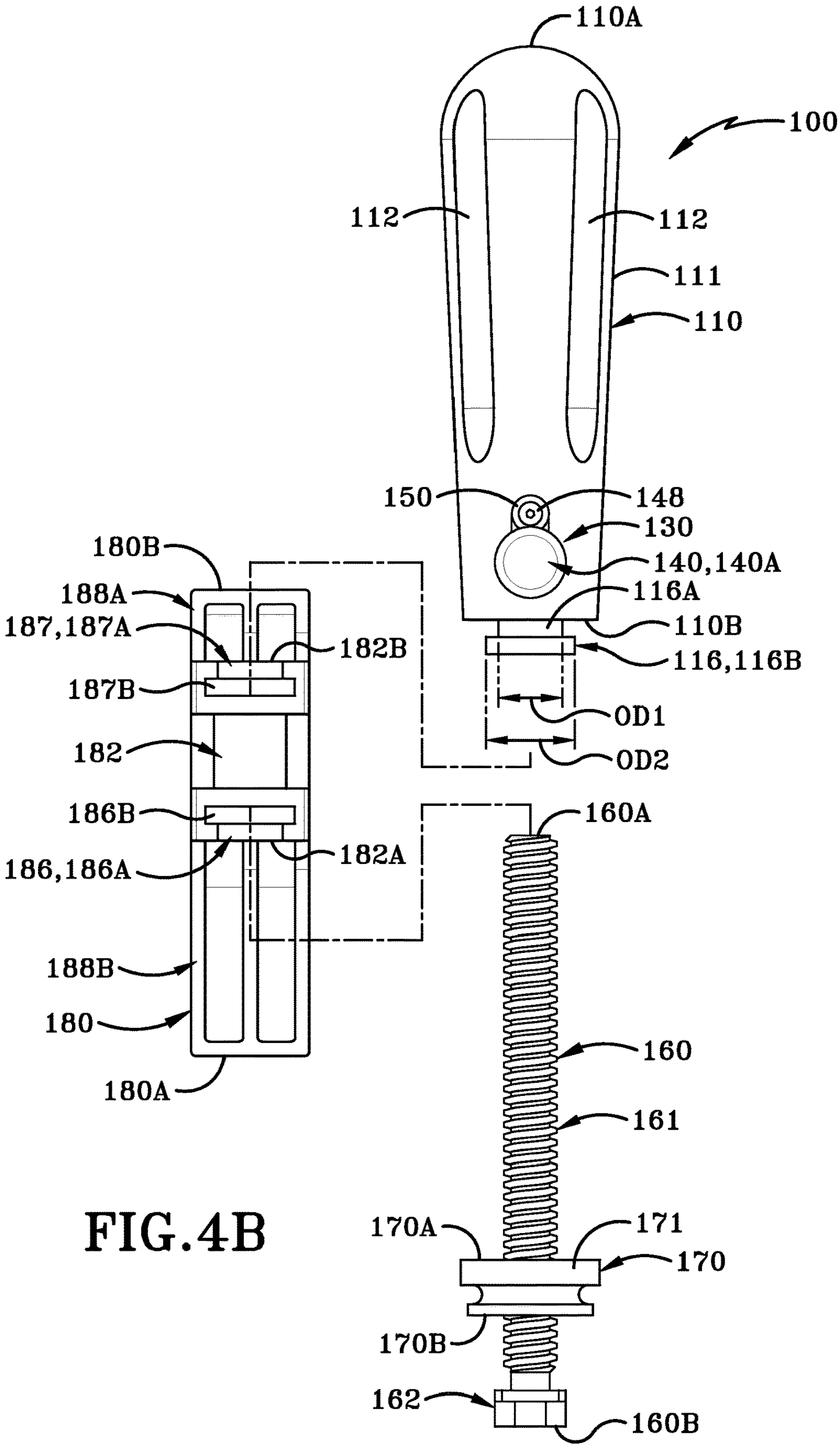
FIG. 4B is an exploded view of the clamping handle assembly in FIG. 1, wherein the clamping block is oriented in a second different orientation.

As illustrated in FIG. 4B, the clamp block 180 is provided in the second orientation relative to the handle 110. In the illustrated embodiment, the first section 187A of the second slot 187 is sized and configured to receive and house the annular groove 116A of the extension 116. In addition, the second section 187B of the second slot 187 is sized and configured to receive and house the lip 116B of the extension 116. Such engagement between the second slot 187 and the extension 116 allows the clamp block 180 to operably engage with the handle 110. In other words, the clamp block 180 interlockingly engages with the handle 110. Moreover, the first slot 186 is positioned away from the handle 110 in the second orientation. Furthermore, the threaded shaft 160 may be feed through the central passageway 184 of the clamp block 180 to collectively operably engage the handle 110 and the clamp block 180 to the threaded shaft 160.

In the illustrated embodiment, the clamp block 180 may be configured to freely rotate about the handle 110 and the threaded shaft 160 when the clamp block 180 is operably engaged to the handle 110. During operation, the clamp block 180 may freely rotate about the extension 116 of the handle 110 on the lip 116B of the extension 116 prior to the clamp block 180 operably engaging with a workpiece. In other words, the rotation of the clamp block 180 may be independent of the rotation of the handle 110. Such independence of rotation between the handle 110 and the clamp block 180 prevents the clamp block 180 from rotating with the handle 110 when a woodworker applies a rotation force on the handle 110 for either tightening or loosening the handle 110 on the threaded shaft 160. Such operation of the handle 110 and the clamp block 180 is described in more detail below.

Referring to FIGS. 1-4B, the clamp block 180 also includes a first holding portion 188A and a second holding portion 188B. In the illustrated embodiment, the first holding portion 188A extends downwardly from the bottom end 182B of the support member 182 to the bottom end 180B of the clamp block 180 parallel to the longitudinal direction of the clamp block 180. The second holding portion 188B extends upwardly from the top end 182A of the support member 182 to the top end 180A of the clamp block 180 parallel to the longitudinal direction of the clamp block 180. As shown in FIG. 10, the first holding portion 188A defines a first length "$C_1$" that extends from the bottom end 182B of the support member 182 to the bottom end 180B of the clamp block 180. The second holding portion 188B defines a second length "$C_2$" that extends from the top end 182A of the support member 182 to the top end 180A of the clamp block 180. In the illustrated embodiment, the second length "$C_2$" is greater than the first length "$C_1$".

The clamp block 180 may be provided in the first orientation or in the second orientation as determined by the woodworker based on any suitable variation, such as the size, shape, and configuration of a workpiece being maintained by a clamping handle assembly.

As illustrated in FIG. 4A, the clamp block 180 is provided in the first orientation where the first holding portion 188A is adjacent to the threaded shaft 160 and disposed proximate to the bolt head 162. In addition, the second holding portion 188B is adjacent to the handle 110 and disposed away from the bolt head 162 of the threaded shaft 160. Referring to FIG. 5A, the first holding portion 188A defines a first height "Hi" from the bottom end 180B of the clamp block 180 to a top surface "TS" of a woodworking tool "WT". In one exemplary embodiment, a first height may have a range from about 1½ inches up to about 3½ inches.

As illustrated in FIG. 4B, the clamp block 180 is provided in the second orientation where the first holding portion 188A is adjacent to the handle 110 and disposed away from the bolt head 162 of the threaded shaft 160. In addition, the second holding portion 188B is adjacent to the threaded shaft 160 and disposed proximate to the bolt head 162. The second holding portion 188B may define a second height (not illustrated) from the top end 180A of the second holding portion 188B of the clamping block 180 to a top surface "TS" of a woodworking tool "WT". In one exemplary embodiment, a second height may have a range from about ½ inches up to about 2½ inches.

Having described the structure of the clamping handle assembly 100 and the various components and connections thereof within clamping handle assembly 100, methods of use thereof will now be described.

Figure 5B:
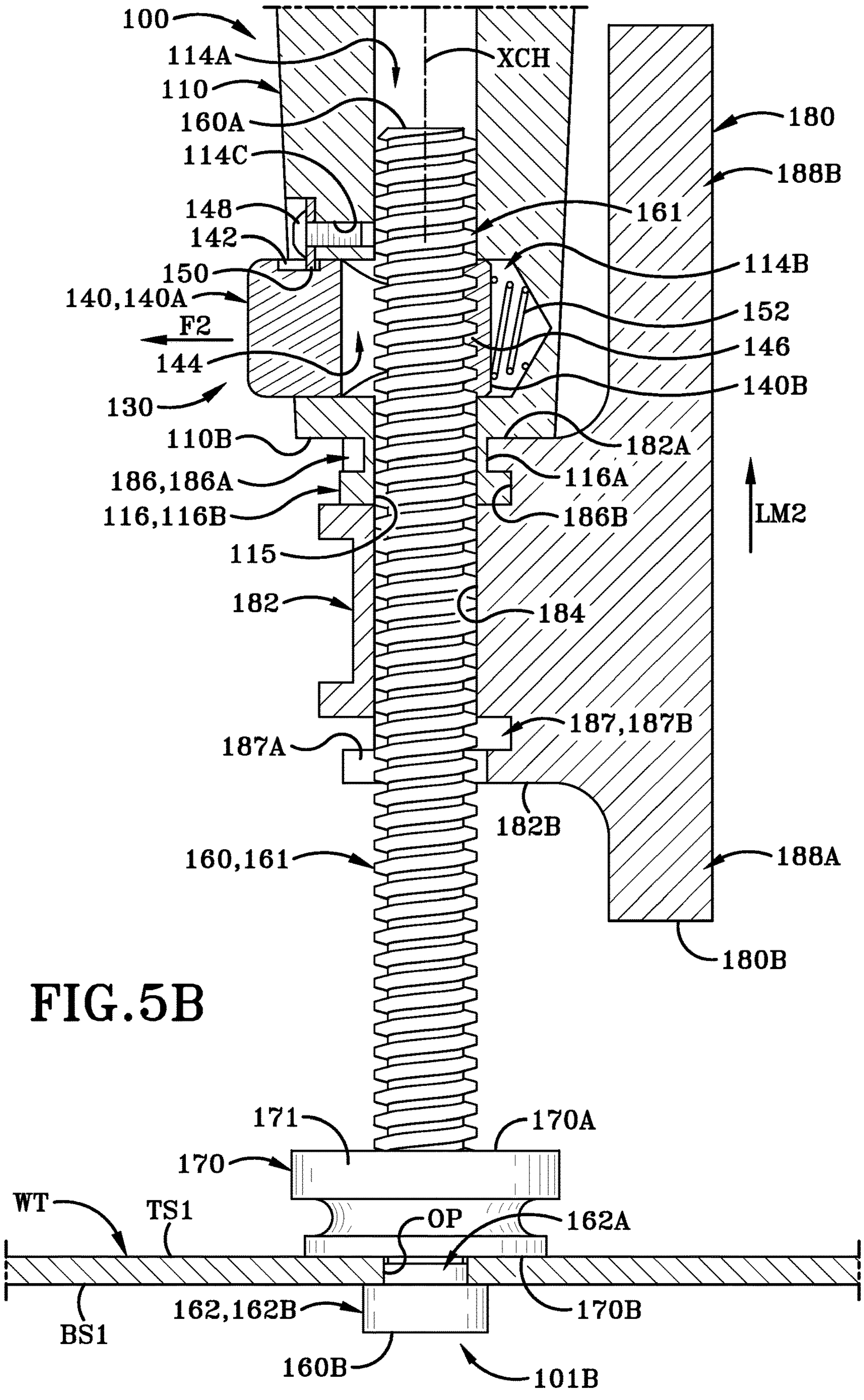
FIG. 5B is a longitudinal cross-section of the clamping handle assembly shown in FIG. 3, wherein the gripping mechanism is actuated from the disengaged position to the engaged position, and wherein the handle and the clamp block are maintained on the threaded shaft.

Prior to introducing a workpiece to a woodworking tool "WT", the woodworker may operably engage at least one clamping handle assembly 100 to a woodworking tool "WT" for a cutting and/or drilling operation (see FIGS. 5A and 5B). In the illustrated embodiment, the woodworker introduces a single clamping handle assembly 100 to the workpiece "WP". As illustrated in FIG. 5A, the woodworker may operably engage the clamping handle assembly 100 to woodworking tool "WT" by creating a securement mechanism between the clamping handle assembly 100 and the woodworking tool "WT".

Still referring to FIG. 5A, the woodworker may disengage and separate the threaded shaft 160 from the handle 110 in order to operably engage the threaded shaft 160 to the woodworking tool "WT" for creating the securement mechanism. As such, the woodworker may introduce the top end 160A of the threaded shaft 160 at a bottom surface "BS1" of the woodworking tool "WT" and may pass the top end 160A of the threaded shaft 160 through an opening "OP" defined by the woodworking tool "WT". The woodworker may then feed the threaded shaft 160 through the opening "OP" and past a top surface "TS1" of the woodworking tool "WT" until the bolt head 162 directly abuts the bottom surface "BS1" of the woodworking tool "WT" (see FIG. 5A). The woodworker may then operably thread the threaded nut 170 to the threaded shaft 160 in which a bottom surface 170B of the threaded nut 170 directly abuts the top surface "TS1" of the woodworking tool "WT". In order to secure the threaded shaft 160 to the woodworking tool "WT", the woodworker applies a rotational force on the threaded nut 170 in a clockwise direction until the threaded shaft 160 and the threaded nut 170 are suitably maintained with the woodworking tool "WT". Here, the bolt head 162 of the threaded shaft 160 and the threaded nut 170 are creating the securement mechanism between the top and bottom surface "TS1", "BS1" of the woodworking tool "WT". In other words, the bolt head 162 and the threaded nut 170 are applying equal, opposing forces on the top surface "TS1" and the bottom surface "BS1" of the woodworking tool "WT" where the bolt head 162 exerts an upward force on the bottom surface "BS1" of the woodworking tool "WT" and the threaded nut 170 exerts a downward force on the top surface "TS1" of the woodworking tool "WT". The woodworker may then introduce and operably engaged the handle 110 to the threaded shaft 160 by actuating the gripping mechanism 130 or by releasably fastening the handle 110 to the threaded shaft 160.

In the illustrated embodiment, the bolt head 162 directly abuts the bottom surface "BS" of the woodworking tool "WT" due to the size, shape, and configuration of the bolt head 162 and the opening "OP" defined by the woodworking tool "WT". As shown in FIG. 5A, the opening "OP" defined by the woodworking tool "WT" defines a first diameter "$D_1$", and the bolt head 162 defines a second diameter "$D_2$". As illustrated, the second diameter "$D_2$" is greater than the first diameter "$D_1$", which allows the bolt head 162 to operably engage with the woodworking tool "WT" and be maintained on the woodworking tool "WT" via the threaded nut 170. If, however, the second diameter "$D_2$" of the bolt head 162 is less than the first diameter "$D_1$" of the opening "OP" defined by the woodworking tool "WT", the clamping handle assembly 100 may include additional components to allow the bolt head 162 of the threaded shaft 160 to operably engage with the woodworking tool "WT". Such additional components that may be used with the threaded shaft 160 are described in more detail below.

Once the clamping handle assembly 100 is operably engaged with the woodworking tool "WT", a woodworker may collectively raise or lower the handle 110 and the clamp block 180 from a first location on the threaded shaft 160 to a second location on the threaded shaft 160 depending on the height of a workpiece. As illustrated in FIG. 5A, the woodworker may collectively lower the handle 110 and the clamp block 180 towards the threaded nut 170 and the woodworking tool "WT" by actuating the gripping mechanism 130 from engaging the threaded shaft 160 to disengaging the threaded shaft 160. Such actuation of the gripping mechanism 130 is shown by an arrow denoted "$F_1$". While the woodworker actuates the gripping mechanism 130, the woodworker may collectively lower the handle 110 and the clamp block 180 away from the threaded nut 170 and towards the bottom end 160B of the threaded shaft 160. Such lowering of the handle 110 and the clamp block 180 is shown by an arrow denoted "LM1". Once the woodworker has determined a desired height for the handle 110 and the clamp block 180, the woodworker may release the gripping mechanism 130 where the gripping mechanism 130 engages the threaded shaft 160, via the biaser 152, and maintains the handle 110 and the clamp block 180 at a second location on the threaded shaft 160. Such release and biasing mechanism provided on the gripping mechanism 130 is shown by an arrow denoted "$F_2$".

In addition, the woodworker may collectively raise the handle 110 and the clamp block 180 away from the threaded nut 170 and the woodworking tool "WT" by actuating the gripping mechanism 130 from engaging the threaded shaft 160 to disengaging the threaded shaft 160. Such actuation of the gripping mechanism 130 is shown by an arrow denoted "$F_1$". While the woodworker actuates the gripping mechanism 130, the woodworker may collectively raise the handle 110 and the clamp block 180 away from the threaded nut 170 and towards the top end 160A of the threaded shaft 160. Such raising of the handle 110 and the clamp block 180 is shown by an arrow denoted "LM2". Once the woodworker has determined a desired height for the handle 110 and the clamp block 180, the woodworker may release the gripping mechanism 130 where the gripping mechanism 130 engages the threaded shaft 160, via the biaser 152, and maintains the handle 110 and the clamp block 180 at a second location on the threaded shaft 160 (see FIG. 56). Such release and biasing mechanism provided on the gripping mechanism 130 is shown by an arrow denoted "$F_2$".

Figure 5C:
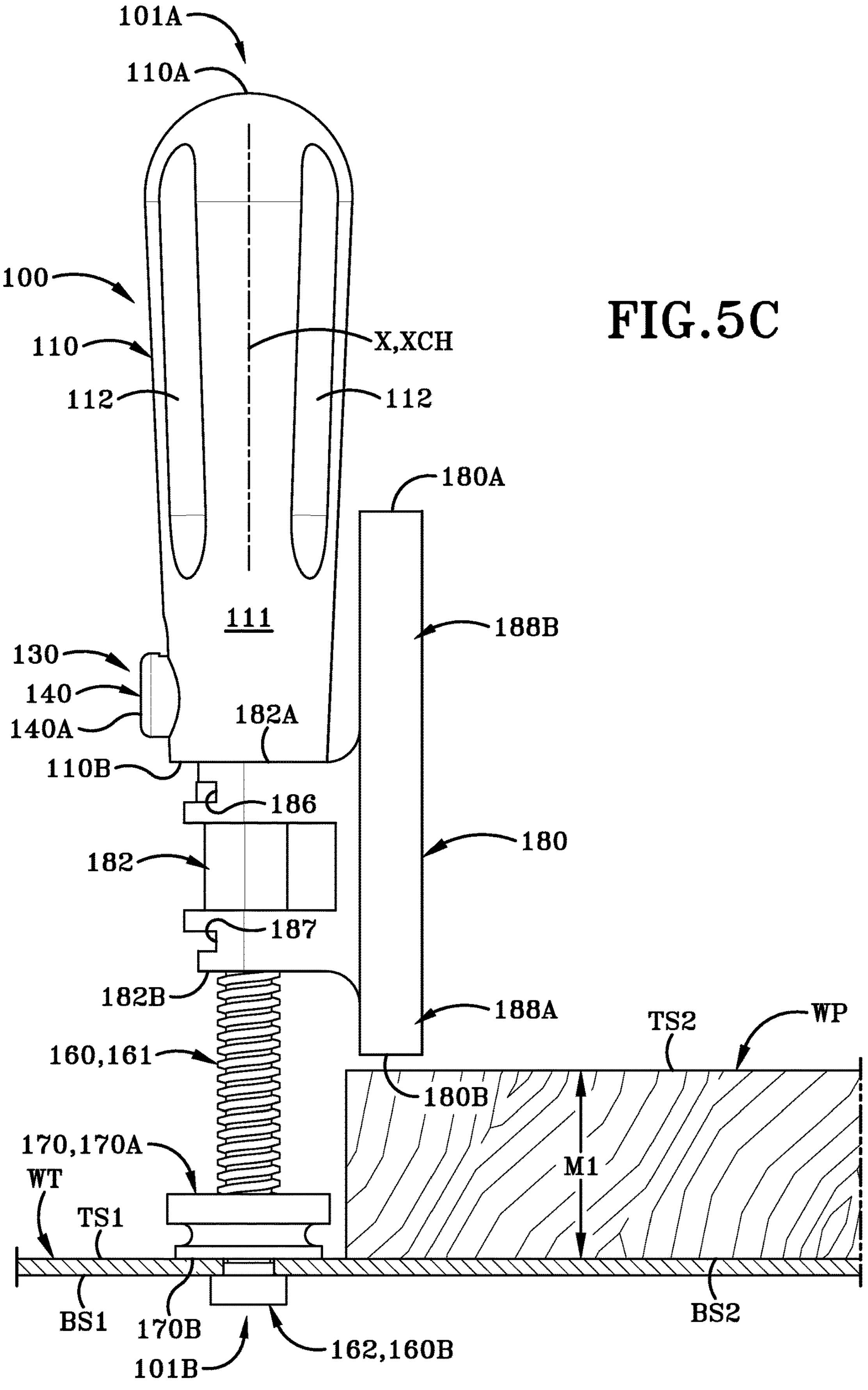
FIG. 5C is a side elevation view of the clamping handle assembly operably engaged to the woodworking tool, wherein the clamp block is provided in the first orientation and disengaged from a first workpiece.

Once the woodworker has determined a suitable height for the handle 110 and the clamp block 180, the woodworker may introduce a workpiece "WP" to the clamping handle assembly 100 and the woodworking tool "WP". As illustrated in FIG. 5C, a bottom surface "BS2" of the workpiece "WP" may contact and rest on the top surface "TS1" of the woodworking tool "WT". Still referring to FIG. 5C, the clamp block 180 is disposed directly above a top surface "TS2" of the workpiece "WP" when the workpiece "WP" is resting on the top surface "TS1" of the woodworking tool "WT". In addition, the workpiece "WP" has a height "M1" that is measured from the top surface "TS2" to the bottom surface "BS2". Given the height "M1" of the workpiece "WP", the woodworker may provide the clamp block 180 in the first orientation (see FIG. 4A) where the first holding portion 188A is provided to operably engage with the workpiece "WP". Once the workpiece "WP" is positioned directly under the clamp block 180, the woodworker may apply a rotational force on the handle 110 in the clockwise direction to operably engage the first holding portion 188A with the top surface "$TP_2$" of the workpiece "WP" (see FIG. 5D). The rotational force applied by the woodworker on the handle 110 is denoted by an arrowed labeled "$R_1$". As the woodworker rotates the handle 110, the clamp block 180 linearly moves downwardly towards the workpiece "WP via the handle 110. The linear force applied by the handle 110 to the clamp block is denoted by an arrow labeled "$LM_3$". The woodworker may cease the rotational force on the handle 110 once the clamp block 180 is suitably tightened to the workpiece "WP" and maintains the workpiece "WP" with the clamping handle assembly 100 and the woodworking tool "WT".

While not illustrated, the woodworker may also actuate the gripping mechanism 130 to operably engage the clamp block 180 to the workpiece "WP". In this operation, the woodworker may collectively move the handle 110 and the clamp block 180 towards the workpiece "WP" while the woodworker is actuating the gripping mechanism 130. The woodworker may release the gripping mechanism 130 once the clamp block 180 is suitably tightened to the workpiece "WP" and may maintain the workpiece "WP" with the clamping handle assembly 100.

Figure 5D:
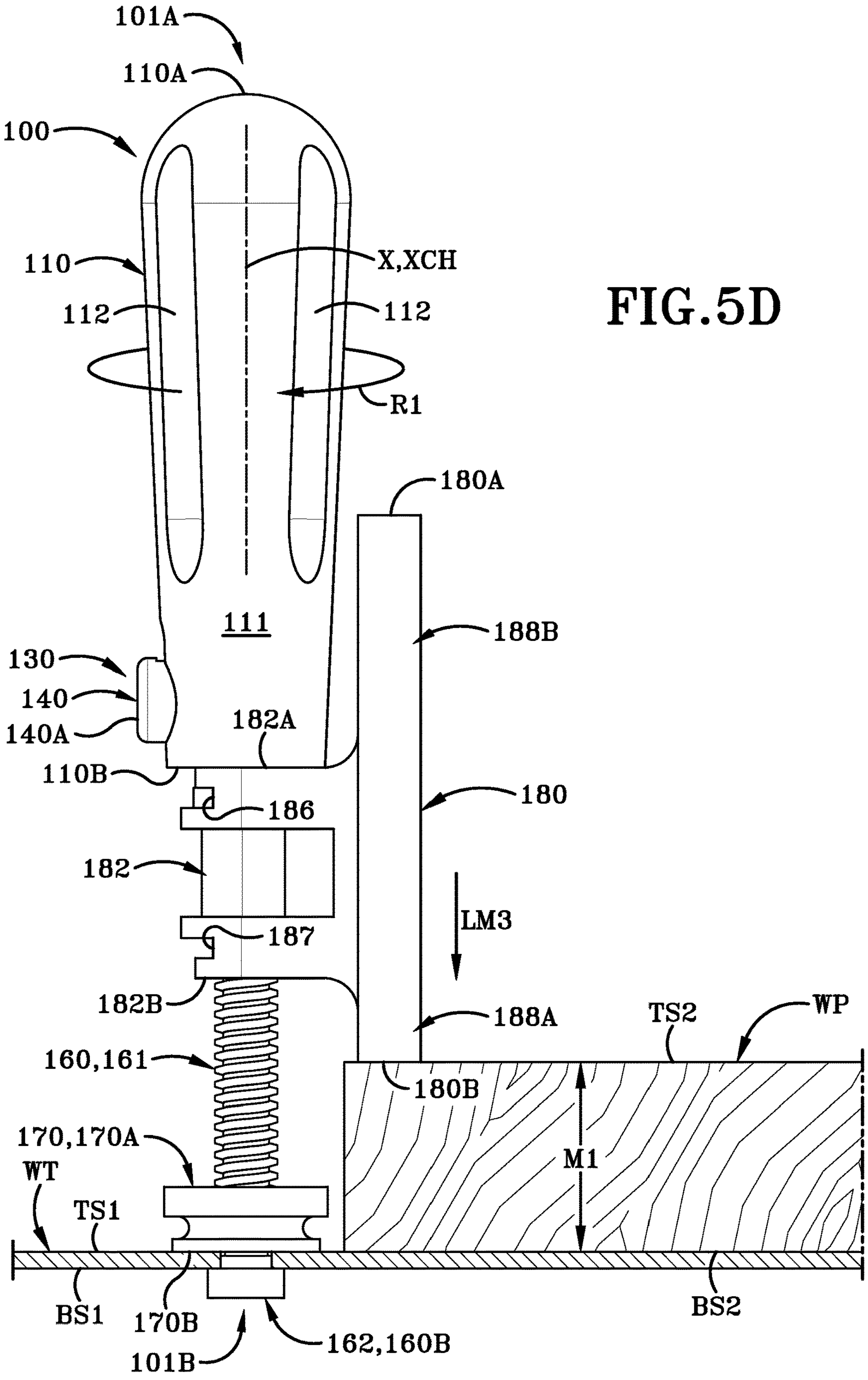
FIG. 5D is a side elevation view similar to FIG. 5C of the clamping handle assembly operably engaged to the woodworking tool, wherein the clamp block is provided in the first orientation and operably engaged to the first workpiece.
Figure 5E:
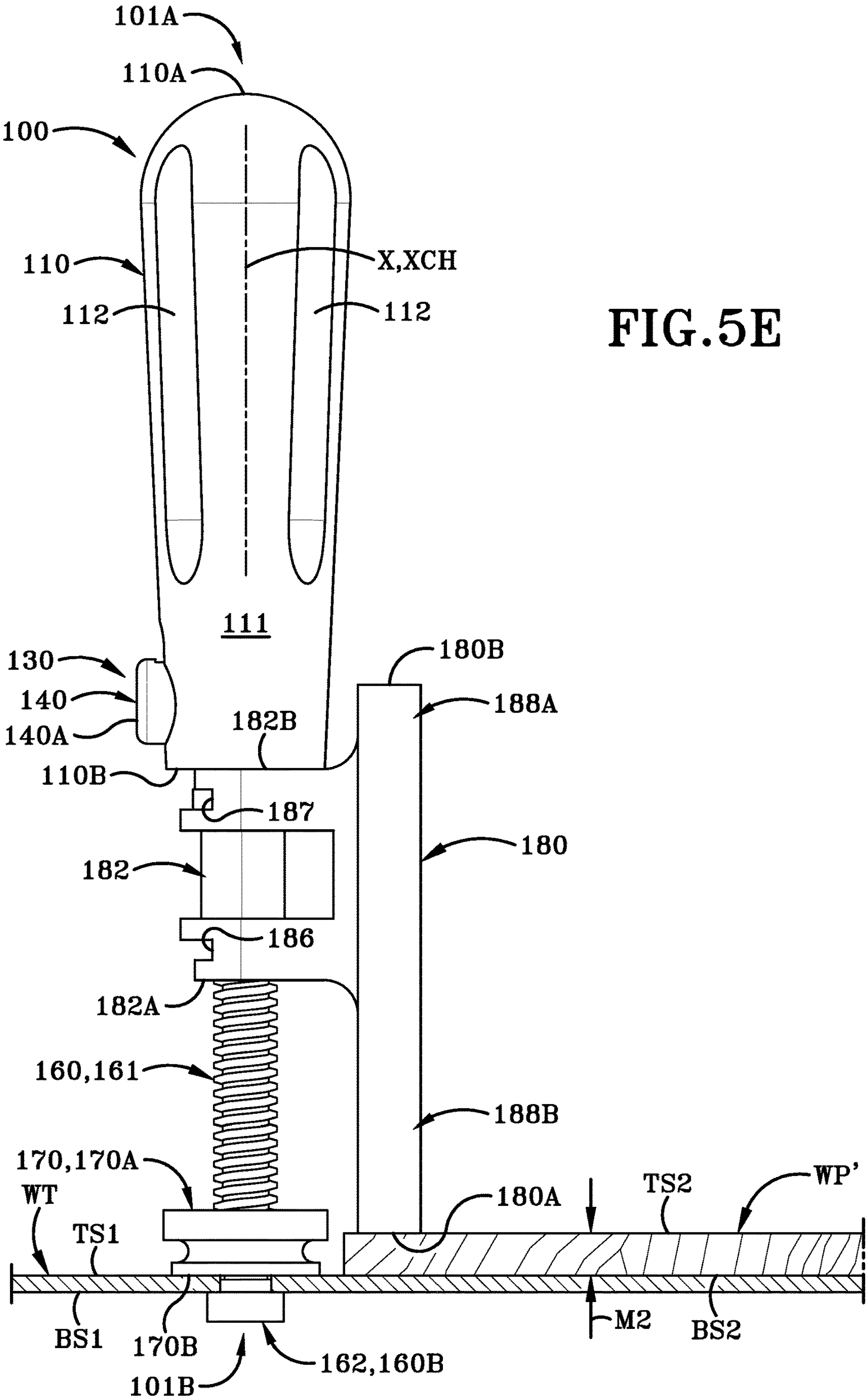
FIG. 5E is a side elevation view similar to FIG. 5C of the clamping handle assembly operably engaged to the woodworking tool, wherein the clamp block is provided in the second orientation and operable engaged to a second different workpiece.

As illustrated in FIG. 5E, the woodworker may introduce a different workpiece "WP" to the clamping handle assembly 100 and the woodworking tool "WT" that has a height "$M_2$" less than the workpiece "WP" illustrated in FIG. 5D. In this arrangement, the woodworker may provide the clamp block 180 in the second orientation (see FIG. 4B) where the second holding portion 188B is provided to operably engage with the workpiece "WP". Generally, a woodworker may choose to arrange the clamp block 180 in the second orientation when the height of the workpiece "WP" is relatively small and/or thin to provide adequate force on workpiece "WP" for maintaining the position of the workpiece "WP" on the woodworking tool "WT". The woodworker may then engage the second holding portion 188B to a top surface "$TP_2$" of the workpiece "WP" similarly to the first holding portion 188A engaging the top surface "$TP_1$" of the workpiece "WP" shown in FIG. 5D.

Figure 6:
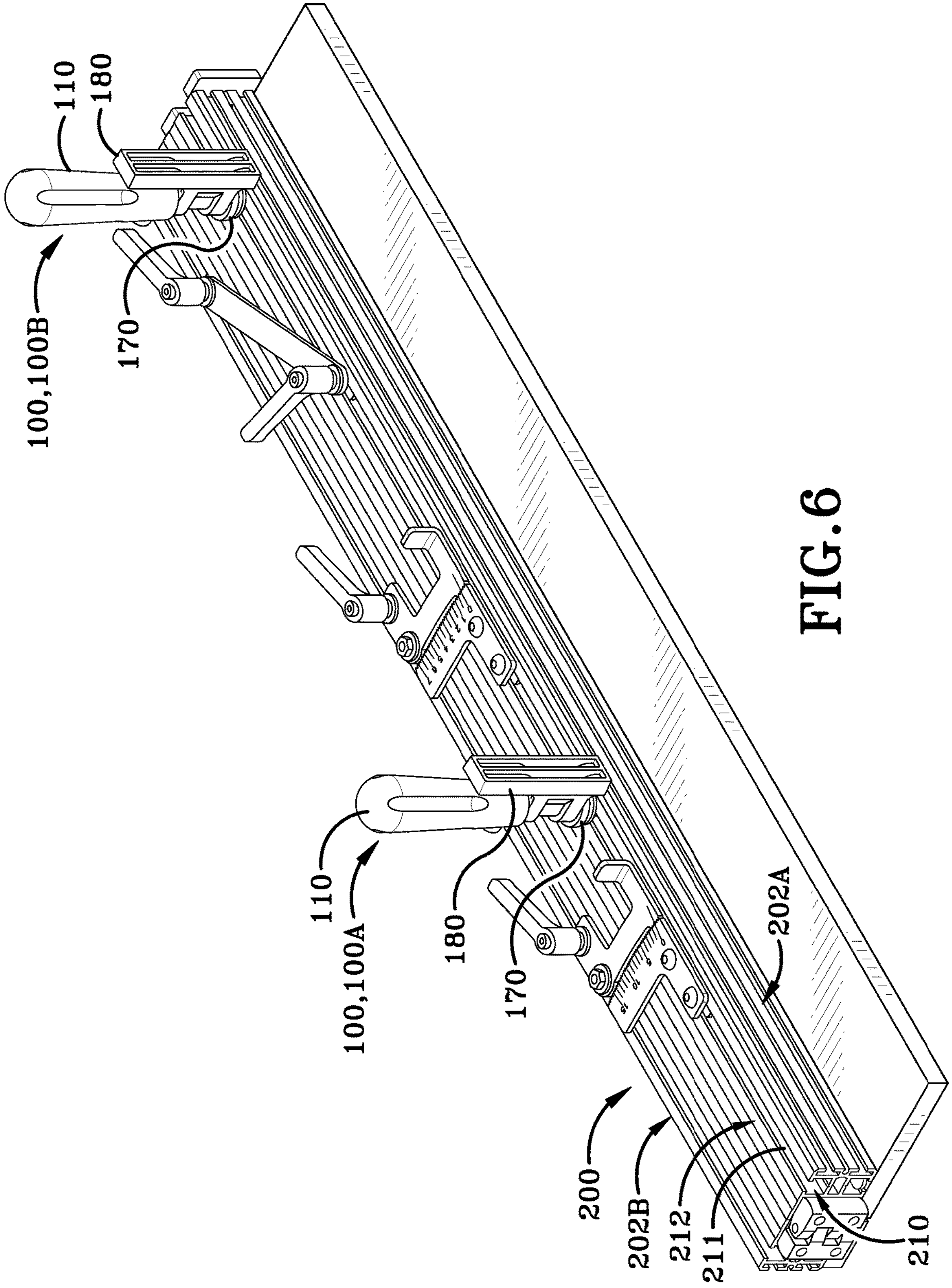
FIG. 6 is a front, top, left, isometric perspective view of first and second clamping handle assemblies in FIG. 1 that are operably engaged to a woodworking tool, wherein the woodworking tool is a taper jig.
Figure 7:
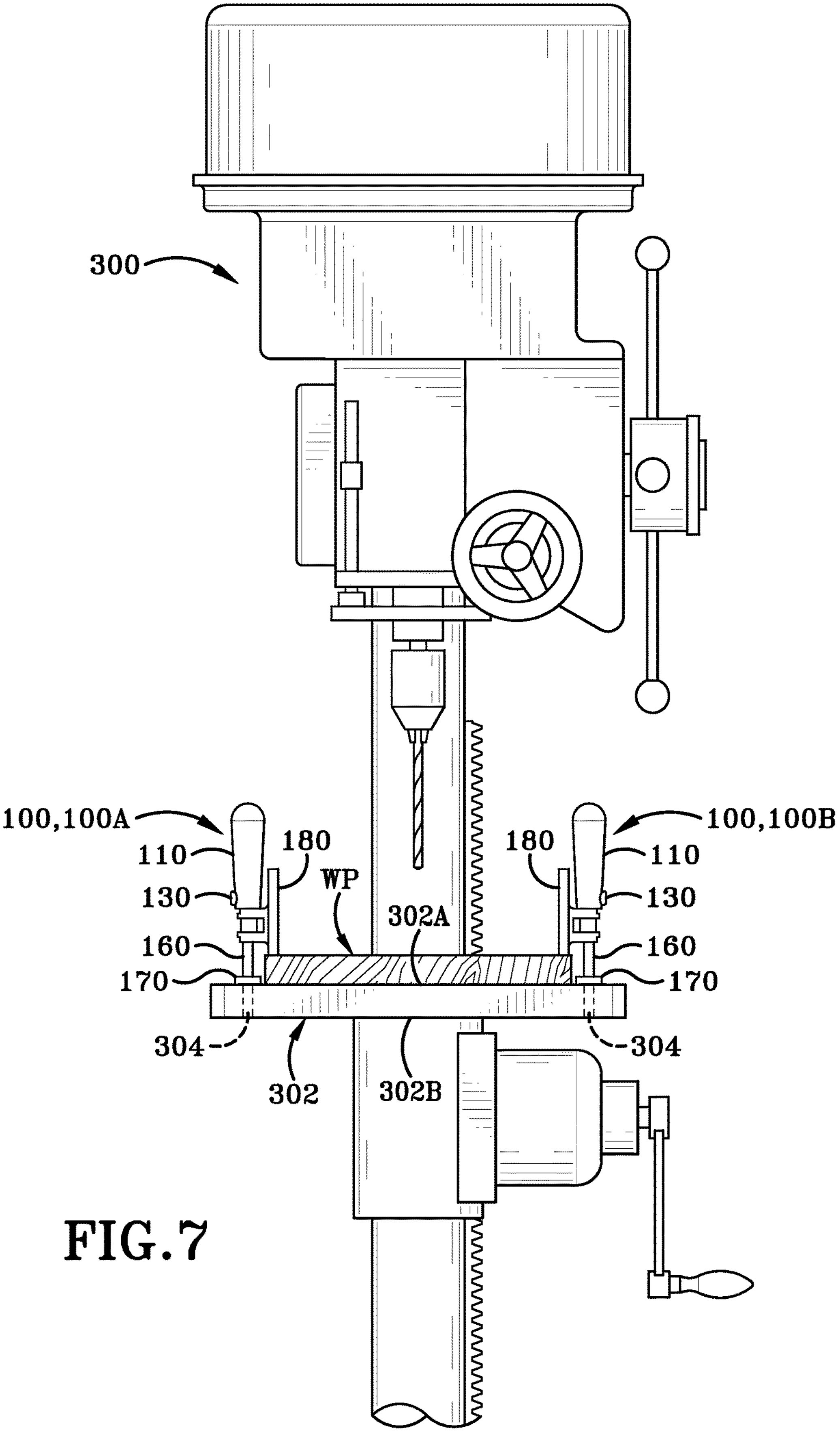
FIG. 7 is a front elevation view of first and second clamping handle assemblies in FIG. 1 that are operably engaged to a woodworking tool, wherein the woodworking tool is a drill press.
Figure 8:
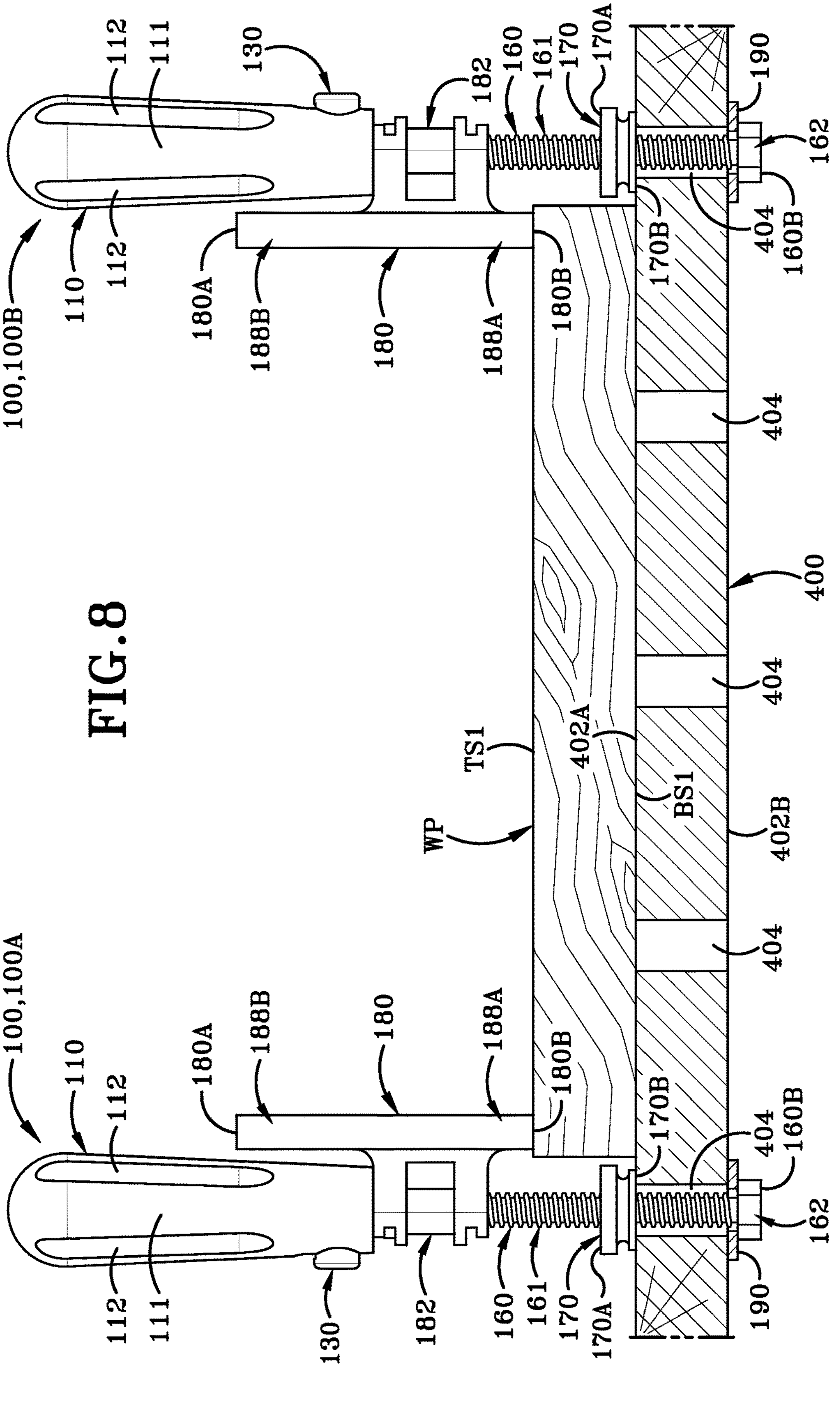
FIG. 8 is a front elevation view of first and second clamping handle assemblies in FIG. 1 that are operably engaged to a woodworking tool, wherein the woodworking tool is a clamping table.

While the clamping handle assembly 100 may be used with any suitable woodworking tool "WT", FIGS. 6 through 8 provide potential woodworking tools for using at least one clamping handle assembly 100.

In FIG. 6, the clamping handle assembly 100 may be used with a taper jig, such as taper jig 200. In the illustrated embodiment, the taper jig 200 may have a first track 202A and a second track 202B for assisting in cutting tapered cuts into different types of workpiece. Still referring to FIG. 6, each of the first and second tracks 202A, 202B may define a top channel 310 that extends along a longitudinal axis of each of the first and second tracks 202A, 202B. The top channel 310 also extends downwardly into each of the first and second tracks 202A, 202B from a top surface 312 along an axis that is parallel with the longitudinal axis of each of the first and second tracks 202A, 202B. The top channel 210 of each of the first and second tracks 202A, 202B is accessible by a top slot 211 defined along a top surface 212 of each of the first and second tracks 202A, 202B.

In this illustrated embodiment, the woodworker may feed the bolt head 162 of the clamping handle assembly 100 through either end of the top channel 210 of one of the first and second tracks 202A, 202B. The woodworker may then operably thread the threaded nut 170 to the threaded shaft 160 in which a bottom surface 170B of the threaded nut 170 directly abuts the top surface 312 of the selected track 202A, 202B. In order to secure the threaded shaft 160 to the selected track 202A, 202B, the woodworker applies a rotational force on the threaded nut 170 in a clockwise direction until the threaded shaft 160 and the threaded nut 170 are suitably maintained with the selected track 202A, 202B. Here, the bolt head 162 of the threaded shaft 160 and the threaded nut 170 are creating the securement mechanism on the selected track 202A, 202B similar to the securement mechanism described above. In other words, the bolt head 162 and the threaded nut 170 are applying equal, opposing forces on the selected track 202A, 202B where the bolt head 162 exerts an upward force on the selected track 202A, 202B inside of the top channel 210 and the threaded nut 170 exerts a downward force on the top surface 212 of the selected track 202A, 202B. The woodworker may then introduce and operably engaged the handle 110 to the threaded shaft 160 by actuating the gripping mechanism 130 or by releasably fastening the handle 110 to the threaded shaft 160.

In FIG. 7, the clamping handle assembly 100 may be used with a drill press, such as drill press 300. In the illustrated embodiment, the drill press 300 may have a worktable 302 that has a top surface 302A and an opposed bottom surface 302B. In addition, the worktable 302 may define a series of openings 304 that extends entirely through the worktable 302 from the top surface 302A to the bottom surface 302B. In the illustrated embodiment, the woodworker may operably engage clamping handle assemblies 100A, 100B to the worktable 302 via the series of openings 304. As such, the woodworker may operably engage the clamping handle assemblies 100A, 100B to the worktable 302 in a substantially similar method and/or technique as described above and illustrated in FIGS. 5A and 5B. Furthermore, the woodworker may operably engage the clamping handle assemblies 100A, 100B to a workpiece "WP" to maintain the workpiece "WP" on the worktable 302 during a drilling process. As such, the woodworker may operably engage the clamping block 180 of the clamping handle assemblies 100A, 100B to the workpiece "WP" in a substantially similar method and/or technique as described above and illustrated in FIGS. 5C through 5E.

In FIG. 8, the clamping handle assembly 100 may be used with a clamping table, such as clamping table 400. In the illustrated embodiment, the clamping table 400 may have a top surface 402A and an opposed bottom surface 402B. In addition, the clamping table 400 may define a series of apertures 404 that extends entirely through the clamping table 400 from the top surface 402A to the bottom surface 402B. In the illustrated embodiment, the woodworker may operably engage clamping handle assemblies 100A, 100B to the clamping table 400 via the series of apertures 404. As such, the woodworker may operably engage the clamping handle assemblies 100A, 100B to the clamping table 400 in a substantially similar method and/or technique as described above and illustrated in FIGS. 5A and 5B. Furthermore, the woodworker may operably engage the clamping handle assemblies 100A, 100B to a workpiece "WP" to maintain the workpiece "WP" on the clamping table 400 during a drilling and/or cutting process. As such, the woodworker may operably engage the clamping block 180 of the clamping handle assemblies 100A, 100B to the workpiece "WP" in a substantially similar method and/or technique as described above and illustrated in FIGS. 5C through 5E.

In this illustrated embodiment, the clamping handle assembly 100 may include a support washer 190. As illustrated in FIG. 8, the support washer 190 may be sized and configured to be received by the threaded shaft 160 in which the support washer 190 is moveable disposed along the threaded shaft 160 but operably engages with the bolt head 162 and the clamping table 400 during engagement with the clamping table 400. As illustrated in FIG. 8, the support washer 190 directly abuts the bottom surface 402B of the clamping table 400 to provide additional support to the bolt head 162 for operably engaging the threaded shaft 160 to clamping table 400. While the support washer 190 is only shown in this illustrated embodiment, the support washer 190 may also be used with the clamping handle assembly 100 in the embodiments described and illustrated herein and other similar applications of the clamping handle assembly 100.

In addition, the woodworker may introduce as many clamping handle assemblies 100 as desired on the taper jig 200, the drill press 300, the clamping table 400, and other similar woodworking tools and/or devices of the like. In the illustrated embodiment, a woodworker may include a first clamping handle assembly 100A and a second clamping handle assembly 100B on the taper jig 200, the drill press 300, the clamping table 400, and other similar woodworking tools and/or devices of the like for multiple purposes (e.g., maintaining a workpiece to woodworking tool, additional gripping mechanisms to use during a cutting or drilling process, etc.).

Figure 9A:
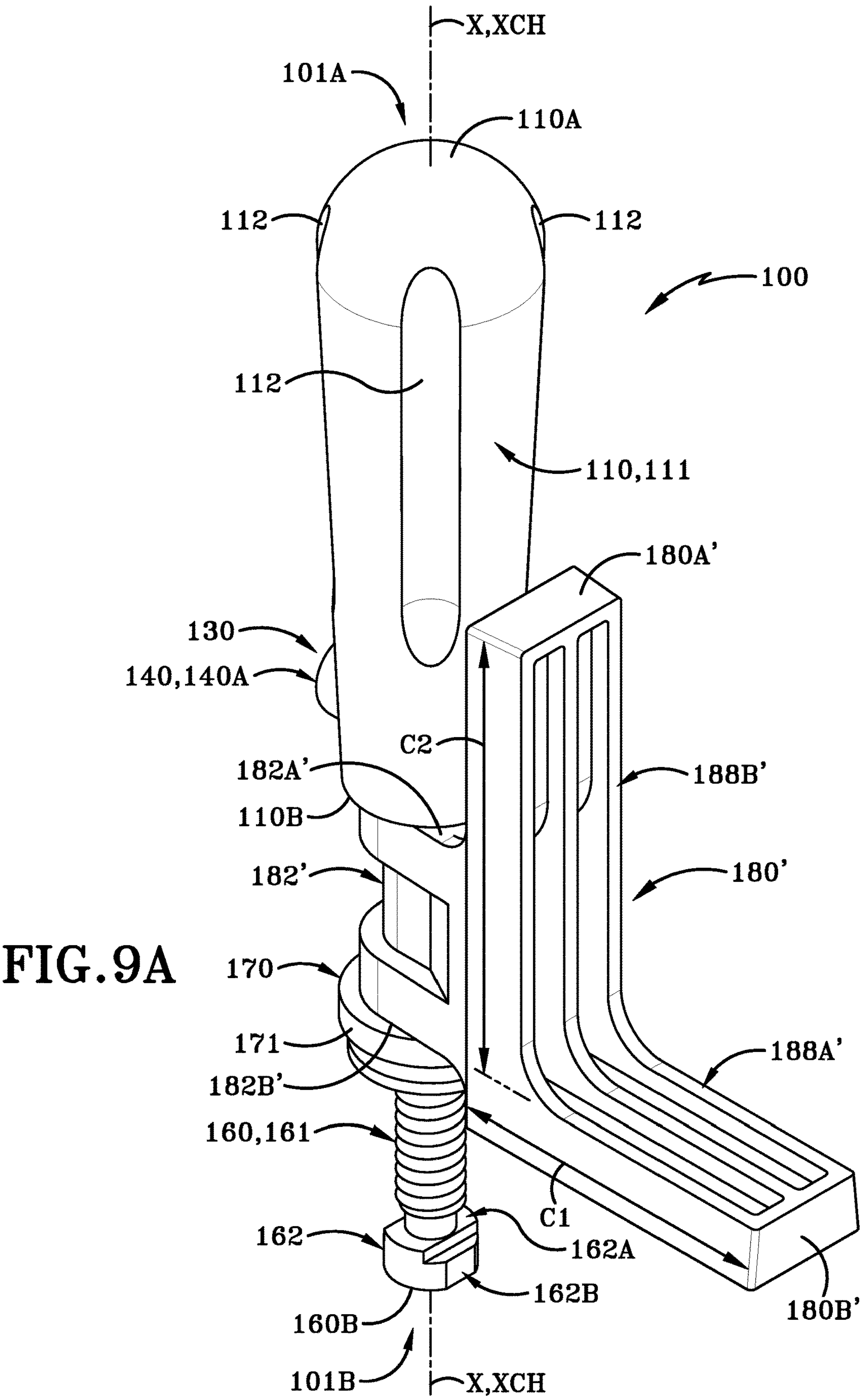
FIG. 9A is a top, rear isometric perspective view of an alternative clamp block provided on the clamping handle assembly in FIG. 1.
Figure 9B:
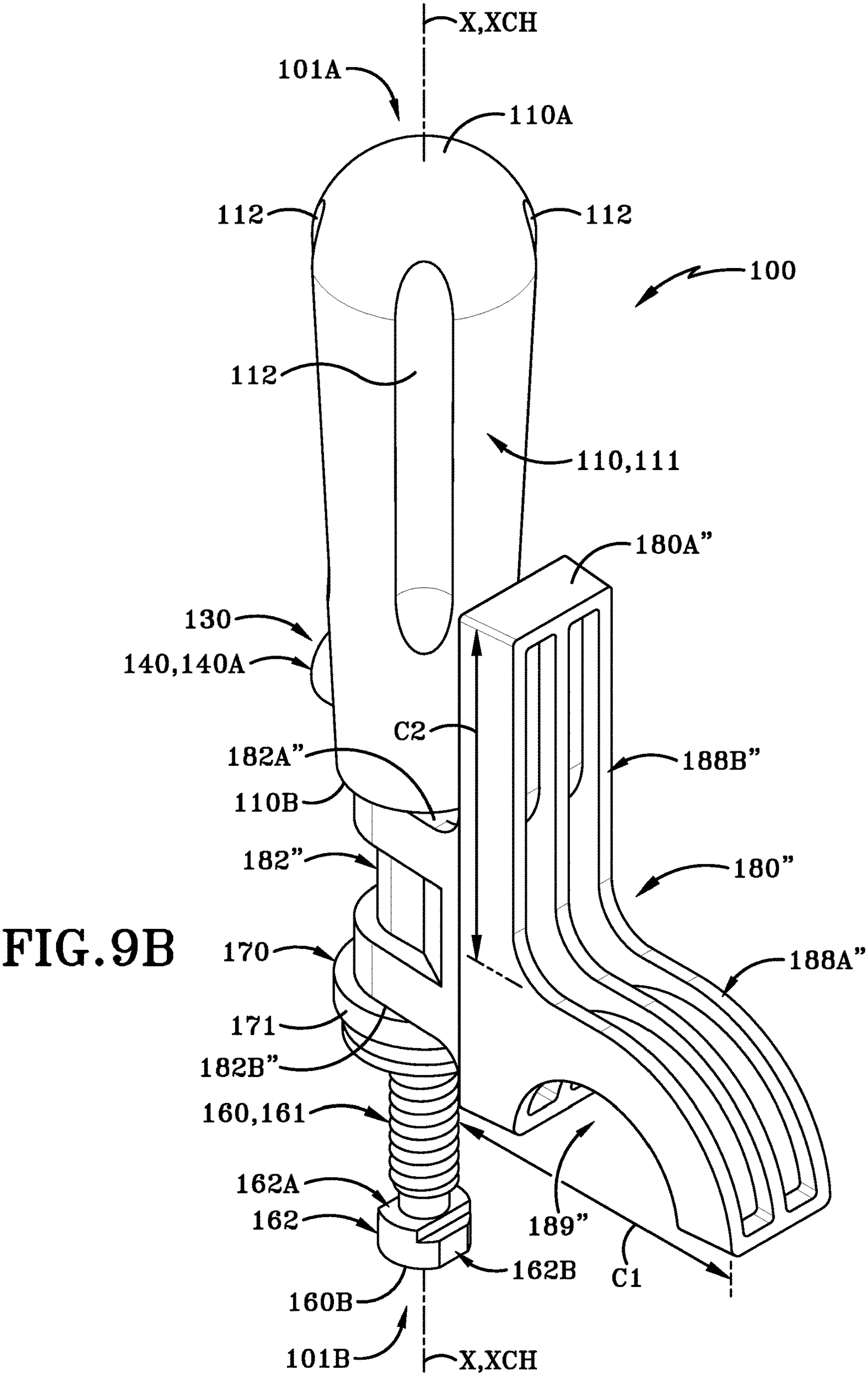
FIG. 9B is a top, rear isometric perspective view of another alternative clamp block provided on the clamping handle assembly in FIG. 1.

In alternative embodiments, the clamp block 180 may define different configurations as illustrated in FIGS. 9A and 9B. The alternative clamping blocks illustrated in FIGS. 9A and 9B are similar to the clamp block 180 described and illustrated herein, except as detailed below.

In one alternative embodiment illustrated in FIG. 9A, an alternative clamp block 180' may be substantially L-shaped in which an alternative first holding portion 188A' is positioned orthogonal to an alternative second holding portion 1886'. In the illustrated embodiment, the alternative first holding portion 188A' defines a first length "$C_1$" that measures from the bottom end 180B' to an end directly opposing the bottom end 180B'. In addition, the alternative second holding portion 1886' defines a second length "$C_2$" that measures from the top end 180A' to the alternative first holding portion 188A'. In the illustrated embodiment, the second length "$C_2$" of the second holding portion 1886' is greater than the first length second length "$C_1$" of the first holding portion 188A'. While the second length "$C_2$" of the second holding portion 1886' is greater than the first length second length "$C_1$" of the first holding portion 188A', other exemplary configurations of the clamp block may be provided herein. In one exemplary embodiment, a first length of a first holding portion of a clamp block may be greater than a second length of a second holding portion of a clamp block. In another exemplary embodiment, a first length of a first holding portion of a clamp block may be equal to a second length of a second holding portion of a clamp block.

In addition, the clamp block 180' is reversible between a first orientation and a second orientation similar to the clamp block 180 described and illustrated herein. As illustrated in FIG. 9A, the clamp block 180' is provided in a first orientation in which the first holding portion 188A' is disposed proximate to the bolt head 162 and the second holding portion 1886' is disposed proximate to the handle 110. While not illustrated herein, the clamp block 180' may be provided in the second, reversed orientation in which the first holding portion 188A' is disposed proximate to the handle 110 and the second holding portion 1886' is disposed proximate to the bolt head 162. A woodworker may desire the first orientation or the second orientation based on the shape, size, and configuration of a workpiece the clamp block may be able to operably engaged to during a cutting or drilling operation.

In another alternative embodiment illustrated in FIG. 9B, an alternative clamp block 180" may have an alternative first holding portion 188A" that is positioned orthogonal to an alternative second holding portion 188B". However, the alternative first holding portion 188A" is substantially curvilinear-shaped in which the first holding portion 188A" defines an opening 189". The opening 189" defined by the first holding portion 188A" may allow the clamp block 180" to suitable grasp and/or maintain a curvilinear workpiece (e.g., a wooden dowel, rod, etc.) during a cutting or drilling process.

In the illustrated embodiment, the alternative first holding portion 188A" defines a first length "$C_1$" that measures from the bottom end 180B' to an end directly opposing the bottom end 180B'. In addition, the alternative second holding portion 188B" defines a second length "$C_2$" that measures from the top end 180A" to the alternative first holding portion 188A". In the illustrated embodiment, the second length "$C_2$" of the second holding portion 188B" is greater than the first length second length "$C_1$" of the first holding portion 188A". While the second length "$C_2$" of the second holding portion 188B" is greater than the first length second length "$C_1$" of the first holding portion 188A", other exemplary configurations of the clamp block may be provided herein. In one exemplary embodiment, a first length of a first holding portion of a clamp block may be greater than a second length of a second holding portion of a clamp block. In another exemplary embodiment, a first length of a first holding portion of a clamp block may be equal to a second length of a second holding portion of a clamp block.

FIG. 10 illustrates a method 500 of maintaining a workpiece relative to a woodworking tool. An initial step 502 of the method 500 comprises operably engaging a handle of at least one clamping handle assembly to a threaded shaft. Another step 504 comprises determining a desired location for the at least one clamping handle assembly on the woodworking tool. Another step 506 comprises operably engaging the threaded shaft with the woodworking tool at the desired location. Another step 508 comprises operably engaging a clamp block with the threaded shaft. Another step 510 comprises applying a clamping force to the workpiece with the clamp block.

In an exemplary embodiment, method 500 may include additional steps of maintaining a workpiece relative to a woodworking tool. An optional step may include the step of operably coupling the clamp block to the handle of the at least one clamping handle assembly. The step of operably coupling the clamp block to the handle is preceded by: selecting to orient the clamp block in one of a first orientation and a second orientation. Optional steps may further include releasably threading a nut to the threaded shaft; abutting the nut to the woodworking tool; and maintaining the threaded shaft at the desired location on the woodworking tool. An optional step may include the step of releasably attaching the handle to the threaded shaft. Optional steps may further include operably coupling the clamp block to the handle; moving a gripping mechanism of the handle from an engaged position to a disengaged position; and moving the handle to a desired position along the threaded shaft. Optional steps may further include releasing the gripping mechanism; moving the gripping mechanism from the disengaged position to the engaged position; and locking the handle to the threaded shaft at the desired position. Optional steps may further include rotating the handle about the threaded shaft; and clamping the clamp block against the workpiece.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A clamping handle assembly, comprising:

a handle defining a chamber between a first closed end of the handle and a second end of the handle, wherein the chamber is only accessible at an opening defined at the second end, said handle having an extension;

a threaded shaft operably engaged with the handle, said threaded shaft being adapted to engage with a woodworking tool, wherein the threaded shaft passes through the opening and is partially housed inside of the chamber of the handle;

a threaded nut operably engaged with the threaded shaft and adapted to selectively directly abut a surface of the woodworking tool;

a gripping mechanism operably engaged with the handle and is releasably engageable with the threaded shaft between an engaged position and a disengaged position relative to the threaded shaft, the gripping mechanism comprises of at least a push button defining a passageway and having an internal threaded wall integrally formed inside of the passageway that interlocks with a portion of the threaded shaft inside of the passageway of the push button in the engaged position;

a clamp block operably engaged with the threaded shaft and interlockingly engaged with the extension of the handle independent from the threaded shaft, said clamp block being adapted to apply a clamping force to a workpiece, and wherein a groove is formed on the handle to interlockingly engage the clamp block.

2. The clamping handle assembly of claim 1, wherein the threaded shaft is freely moveable inside the handle when the gripping mechanism is in the disengaged position.

3. The clamping handle assembly of claim 1, wherein the threaded shaft has a first end and a second end, and wherein a portion of the threaded shaft which is located between the first end and the second end is maintained inside of the handle when the gripping mechanism is in the engaged position.

4. The clamping handle assembly of claim 1, wherein the threaded shaft is releasably engaged with the gripping mechanism when the gripping mechanism is in the engaged position.

5. The clamping handle assembly of claim 1, wherein the gripping mechanism further comprises:

a pin operably engaged with the handle for limiting the push button between the engaged position and the disengaged position; and a biaser operably engaged with the push button biasing the push button to the engaged position.

6. The clamping handle assembly of claim 1, wherein the threaded shaft further comprises:

a bolt head that is adapted to be operably engaged within an opening defined by the woodworking tool.

7. The clamping handle assembly of claim 1, wherein the clamp block is selectively movable between a first orientation and a second orientation.

8. The clamping handle assembly of claim 7, wherein the clamp block includes a first holding portion having a first length, and a second holding portion having a second length, where the second length is shorter than the first length; and when the clamp block is in the first orientation, the first holding portion is adapted to engage the workpiece; and when the clamp block is in the second orientation, the second holding portion is adapted to engage the workpiece.

9. The clamping handle assembly of claim 1, wherein the clamp block has a generally T-shaped configuration and comprises:

a support member operably engaged with the threaded shaft and the handle; and a clamping portion having a first holding portion and a second holding portion, wherein the second holding portion is of a greater length than the first holding portion.

10. The clamping handle assembly of claim 1, wherein the clamp block comprises:

a clamping portion having a first holding portion and a second holding portion, wherein the second holding portion is orthogonal to the first holding portion; and a support member extending outwardly from the second holding portion in a direction opposite to the first holding portion; and wherein the support member is operably engaged with the threaded shaft and the handle.

11. The clamping handle assembly of claim 1, wherein the clamp block comprises:

a clamping portion having a first holding portion and a second holding portion, wherein the first holding portion has a curvilinear-shape; and a support member extending orthogonally outwardly from the second holding portion.

* * * * *